Figure 3:
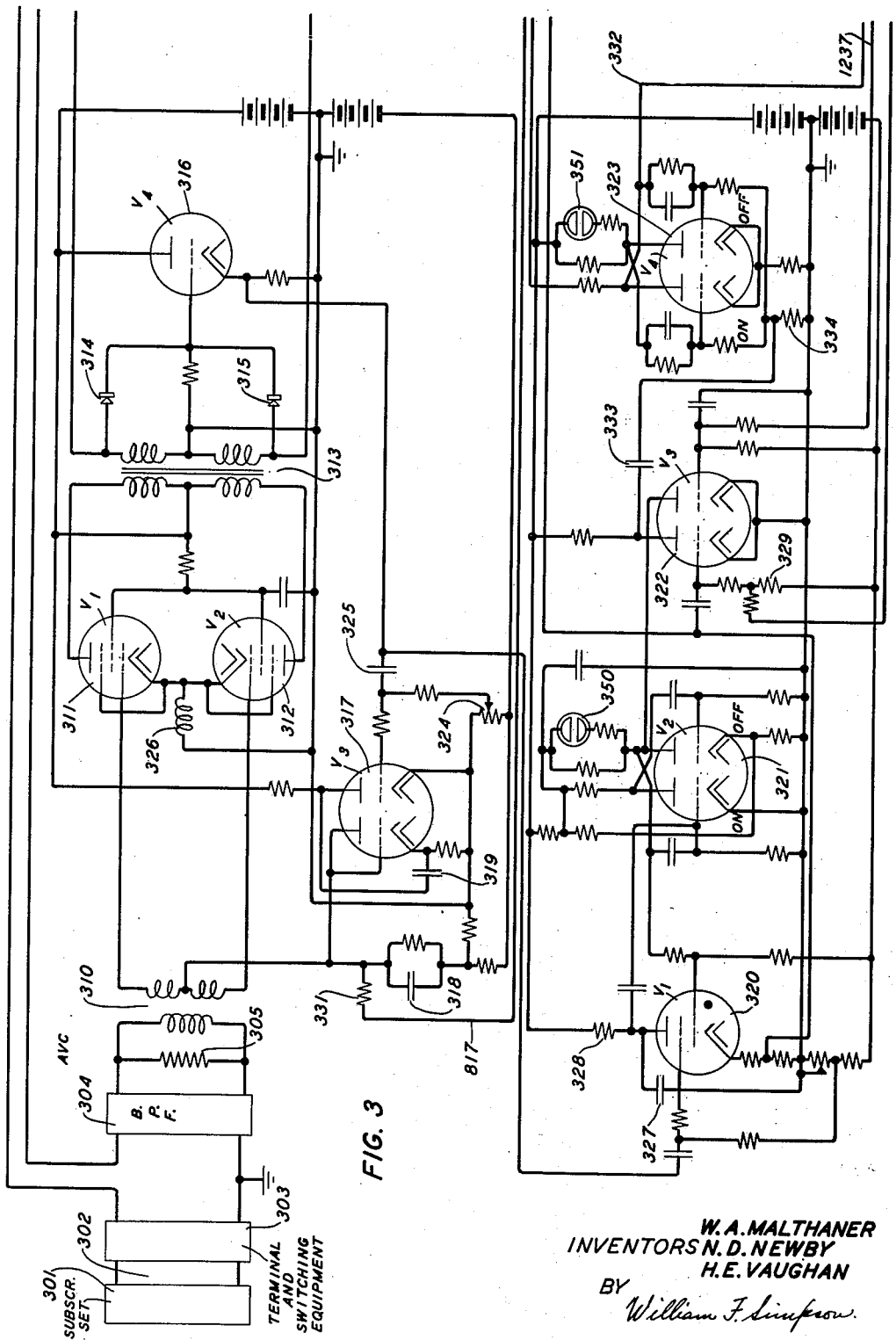

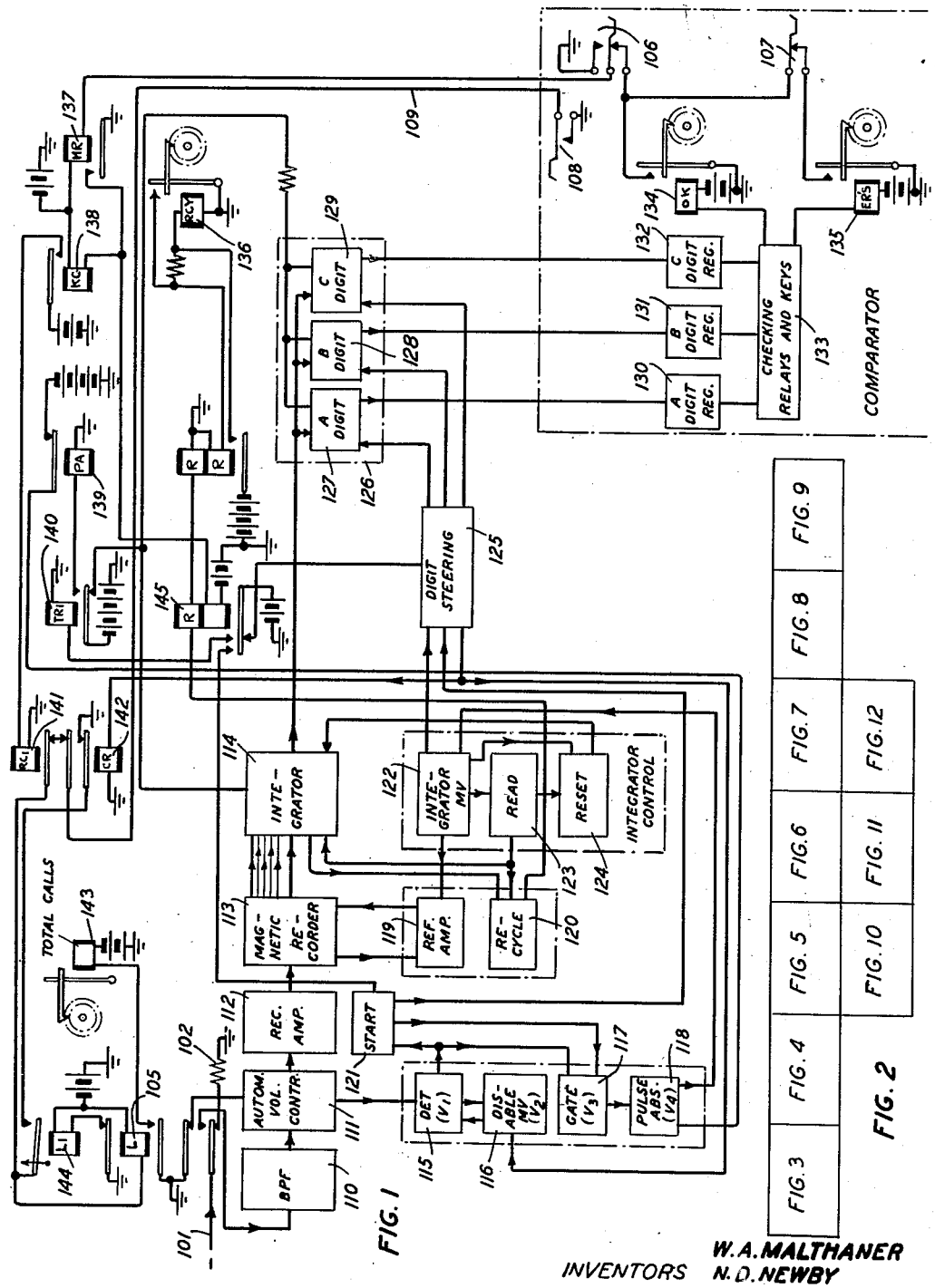

COMPARATOR

INVENTORS: W. A. MALTHANER
N. D. NEWBY
H. E. VAUGHAN

BY William F. Simpson

ATTORNEY

COMPARATOR

INVENTORS W. A. MALTHANER
N. D. NEWBY
H. E. VAUGHAN
BY William F. Simpson,
ATTORNEY Oct. 28, 1952 W. A. MALTHANER ET AL 2,615,971
PULSE POSITION DIAL RECEIVER EMPLOYING PULSE
SUPERPOSITION FOR IDENTIFYING DIGITS
Filed Dec. 30, 1948 13 Sheets-Sheet 12

INVENTORS W. A. MALTHANER
N. D. NEWBY
H. E. VAUGHAN
BY William F. Simpson
ATTORNEY Oct. 28, 1952     W. A. MALTHANER ET AL     2,615,971
PULSE POSITION DIAL RECEIVER EMPLOYING PULSE
SUPERPOSITION FOR IDENTIFYING DIGITS
Filed Dec. 30, 1948     13 Sheets-Sheet 13

INVENTORS   W. A. MALTHANER
N. D. NEWBY
H. E. VAUGHAN

BY William F. Simpson
ATTORNEY

Patented Oct. 28, 1952

2,615,971

UNITED STATES PATENT OFFICE 2,615,971

PULSE POSITION DIAL RECEIVER EMPLOYING PULSE SUPERPOSITION FOR IDENTIFYING DIGITS

William A. Malthaner, Summit, Neal D. Newby, Leonia, and Henry E. Vaughan, Chatham, N. J., assignors to Bell Telephone Laboratories, Incorporated, New York, N. Y., a corporation of New York Application December 30, 1948, Serial No. 68,234

17 Claims. (Cl. 177—353)

This invention relates to calling and signaling methods, apparatus and systems, and more particularly to improvements in the methods, apparatus and systems disclosed in the patent application of Malthaner-Newby-Vaughan, filed on or about June 29, 1948, Serial No. 35,924.

Signaling and calling arrangements in accordance with the present invention may be advantageously employed in automatic telephone switching systems wherein a subscriber initiates a call and directs automatic switching equipment at distant switching points to establish connections to desired called party's line.

More particularly, the present invention is directed to calling equipment and methods of operation thereof in which each element or digital position of a called subscriber's designation is represented by two pulses of short duration which may be readily transmitted over voice frequency communication paths and in which the time interval elapsing between the two pulses represents the numerical value of the digit or the characteristics of the symbol.

In accordance with the exemplary embodiment of the invention set forth in detail herein the signaling or calling pulses represent subscriber's designations. In many types of telephone switching systems these designations comprise a multidigit number which frequently includes an office designation of one or more letters or numbers or a combination of letters and numbers followed by a multidigit line number. These designations are in turn sometimes followed by another letter or number which is frequently employed to designate the particular party connected to a party line.

It is, of course, possible to designate called subscriber's station by any suitable symbol or group of symbols forming a code or station designation.

In order that these designations may be more readily referred to it is assumed that each designation comprises a number of elements which in the exemplary embodiment set forth is eight.

Each of these elements is referred to herein as a symbol or digit. In order to avoid further ambiguity in describing the operation of the system in response to the various signals representing the symbols or digits the designation will be described as comprising a number of digital positions, that is eight digital positions in the exemplary embodiment set forth herein, and each of the digits or symbols in each of the digital positions or symbol positions may comprise a digit of any one of a plurality of different magnitudes or may comprise symbols in any one of a plurality of different characteristics.

Each of the pulses transmitted is of sufficiently short duration so that it may be readily transmitted over voice frequency communication paths, through repeating coils, filters, amplifiers, and other equipment associated with voice frequency communication paths. These pulses may be also transmitted through modulating equipment and then over carrier current and radio systems in the same manner as voice frequency currents, as is well understood.

The arrangement set forth herein in detail is designed to cooperate with a source of such pulses representing the number or designation of the called station which is transmitted repetitively. A suitable form of pulse generating equipment for generating pulses at the subscriber's station with which the exemplary embodiment set forth herein is designed to cooperate is disclosed in an application of Parkinson, filed on or about June 29, 1948, Serial No. 35,930.

In order to operate such signaling or calling equipment at the subscriber's station, it is frequently necessary to supply operating power over the subscriber's line and employ a filter or filters to separate the power frequency from the signaling frequencies. Such a filter or filters together with transmission systems frequently encountered in telephone transmission networks frequently cause distortion of the signaling pulses.

The arrangement set forth in the above-identified application of Malthaner et al., Serial No. 35,924, filed June 29, 1948 employs amplitude responsive means for recognizing a received pulse. In other words, when the amplitude of the power, current, voltage or other significant characteristic of the received pulse exceeds a predetermined reference value the equipment responds thereto and indicates the reception of a pulse at that time. In employing such an arrangement over long carrier systems including long carrier current systems, excessive distortion is frequently encountered which distortion renders such indications of received pulses unreliable.

It is an object of the present invention to provide methods, apparatus and circuits to overcome these difficulties by comparing the two pulses representing each element of digital position of the subscriber's designation. Inasmuch as both pulses are transmitted over the same transmission path they are subject to the same attenuation and usually to the same types of distortion so that more reliable operation may be obtained when such pulses are received and compared.

However, in extreme cases, even though both pulses are transmitted over the same transmission path and are attenuated thereby, the phase distortion may vary from instant to instant and thus from pulse to pulse and produce a sufficient change in the wave forms of two successive pulses so that it is unreliable to compare the amplitudes of the two pulses at any given corresponding interval of time within the respective pulse intervals. Such types of distortion are encountered in long carrier current systems due in part to slight differences in the frequencies applied for modulating and for demodulating the signals in single sideband carrier systems.

It is an object of the present invention to provide methods, apparatus and circuits to overcome these difficulties by comparing the pulses representing each element or digital position of the subscriber's designation for a substantial portion of the pulse interval which portion may include the entire pulse interval.

An object of this invention is to compare two pulses by deriving a voltage, current, or other electrical quantity from a significant characteristic of each of the pulses such as power, current, or voltage, taking the difference between the values of the quantity derived from the two pulses and then integrating the absolute value of this difference over a substantial or major portion of an entire pulse interval. The presence of the pulses is then determined by the magnitude of said sum of integration.

A feature of this invention relates to the use of a full wave rectifier or its equivalent to obtain the absolute magnitude of an electrical voltage or current. Another feature of this invention relates to the use of a full wave rectifier or its equivalent in combination with an electrical storage device such as a condenser to integrate the absolute magnitude, without regard to sign or polarity, of an electrical quantity such as a current, over a predetermined interval of time.

An object of this invention is to combine or take the difference between a reference pulse and a pulse representing an element or digital identity of a subscriber's designation by delaying one of these pulses by different times and then comparing the various delayed pulses with the other of the two pulses by taking the difference between these pulses and then integrating the sum of the absolute values of the differences for an interval of time substantially coinciding with the duration time of one of said pulses and then selecting the pulses in which said integrated sum does not exceed a predetermined reference value.

A feature of this invention relates to applying pulses to a plurality of delay devices or paths, each having a different delay interval of time which delay intervals or times are equal to or a function of the possible expected different time intervals between the pulses representing the elements or character of a subscriber's designation. The output of each of the delay devices is then combined with an undelayed stop pulse in such a manner that the undelayed stop pulse will effectively cancel for substantially the entire pulse duration the delayed start pulse in one and only one of said delay devices. The device or delay path in which the stop pulse cancels the delayed start pulse designates the magnitude of the digit or identifies the character or symbol of a subscriber's designation represented by the pulses.

A feature of the invention relates to a mechanical storing and delay device comprising a rotating magnetic disc, a recording coil located near the periphery of said disc and a plurality of pick-up coils spaced around the rotating disc for providing different delay intervals and a magnetic erasing means for erasing previously recorded signals and preparing the disc for recording of subsequent signals.

In systems of the type set forth herein in detail, it is necessary to distinguish or recognize the beginning of each station designation so that the digits may be placed in their proper position in the called subscriber's designation. In order that this may be accomplished the calling equipment at the subscriber's station is arranged to interpose delays or pauses, frequently called blanks, in the transmission of signals between each series of pulses or signals representing a complete subscriber's designation.

A feature of the present invention is directed to means for recognizing these pauses or blanks and conditioning receiving equipment in response to such pauses to receive the following series of pulses designating the called subscriber's station.

Another feature of the present invention relates to apparatus for checking that upon the reception of two pulses a digit is properly identified for predetermined ones of the digits of a subscriber's number and employing the complete set of pulses recorded after two pulses properly identify a digit for each of said predetermined digits and for disregarding the complete set of pulses in case more or less than two pulses are received for each of said predetermined digits.

Another feature relates to circuits and apparatus and methods of operation for picking out or selecting certain digital positions of a subscriber's designation to control the switching circuits or apparatus at any switching position or station.

Another feature is directed to circuits, apparatus and methods for repeatedly resetting the receiver and related switching circuits between series of pulses representing complete called subscriber's designation.

Another feature relates to circuits and switching equipment for directing the response of the receiving equipment to each group of pulses representing a symbol or digit to recording or storing circuits or apparatus.

Figure 12:
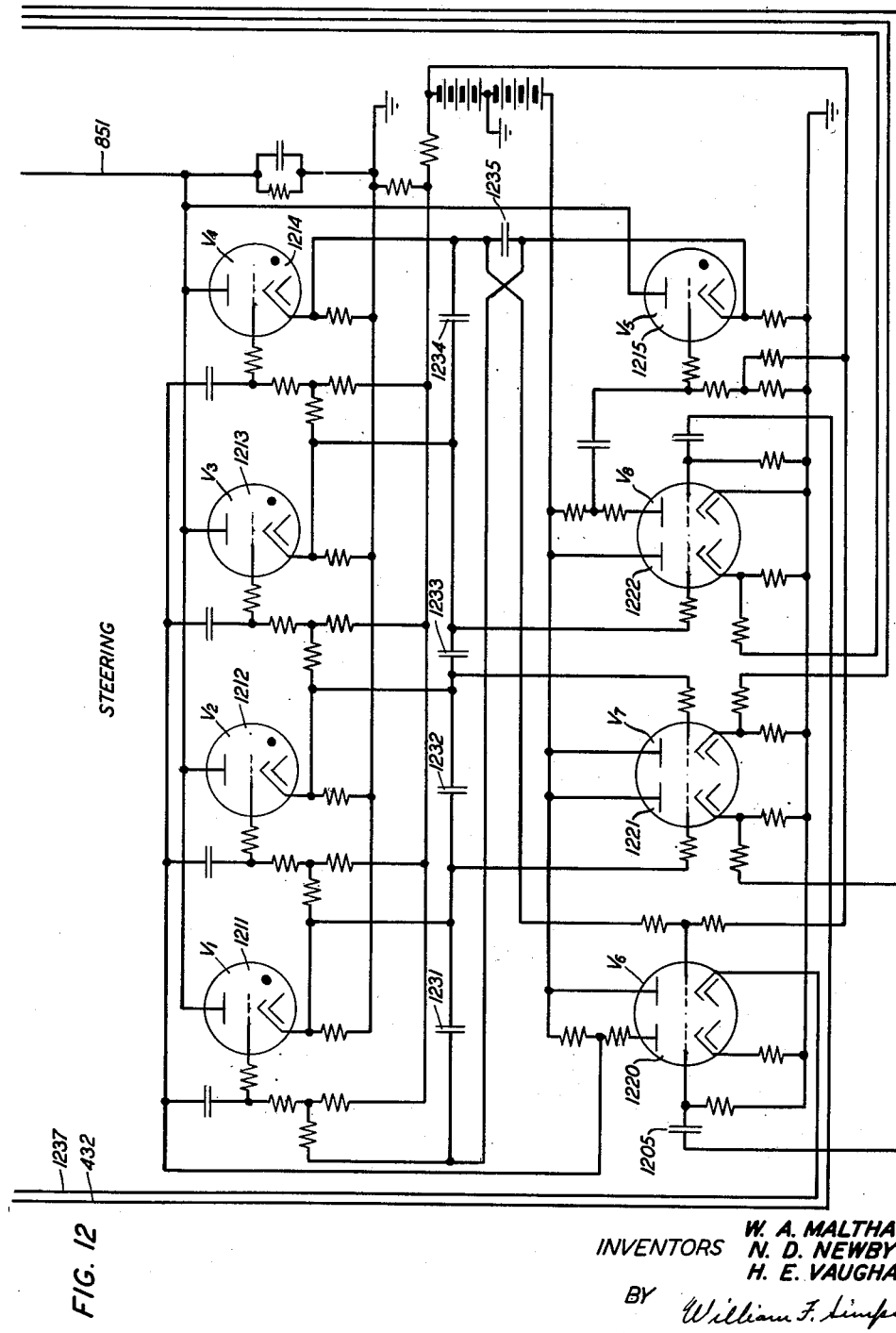
Figure 13:
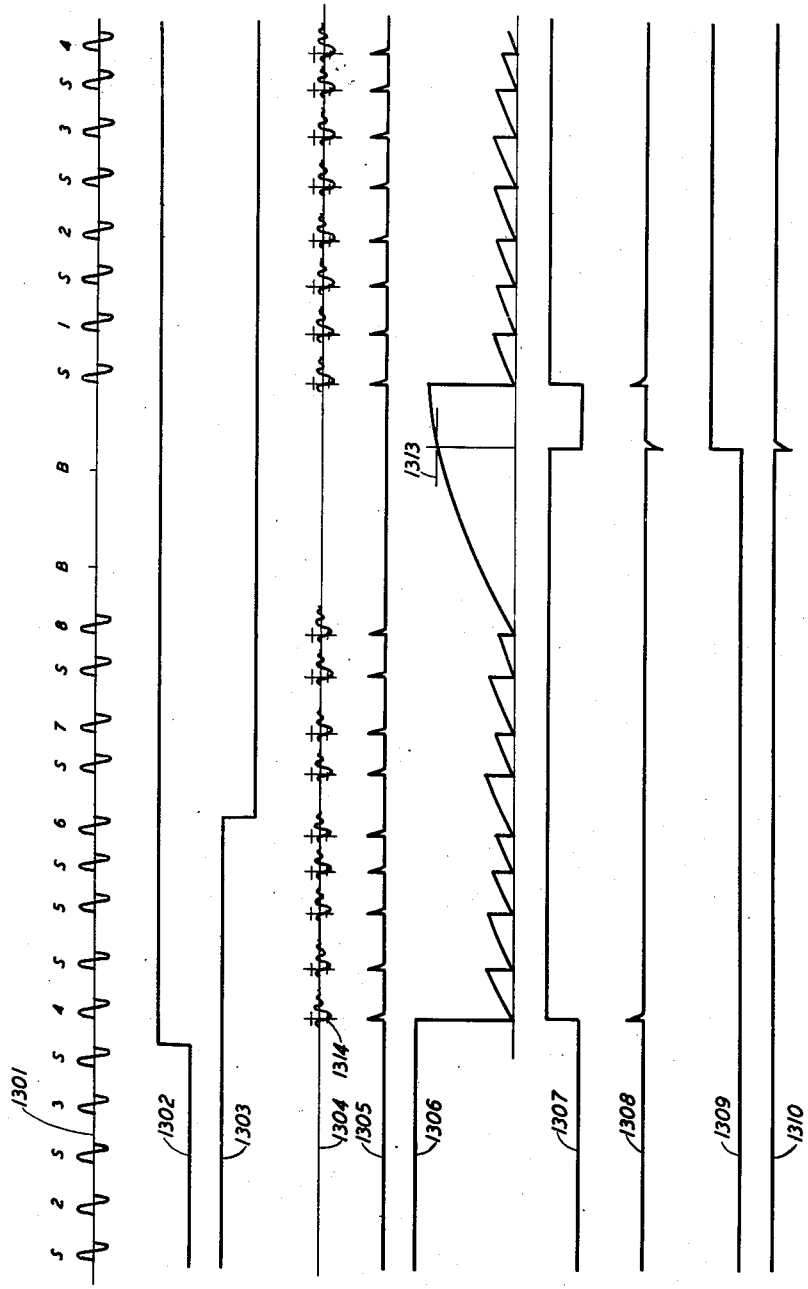
Figure 14:
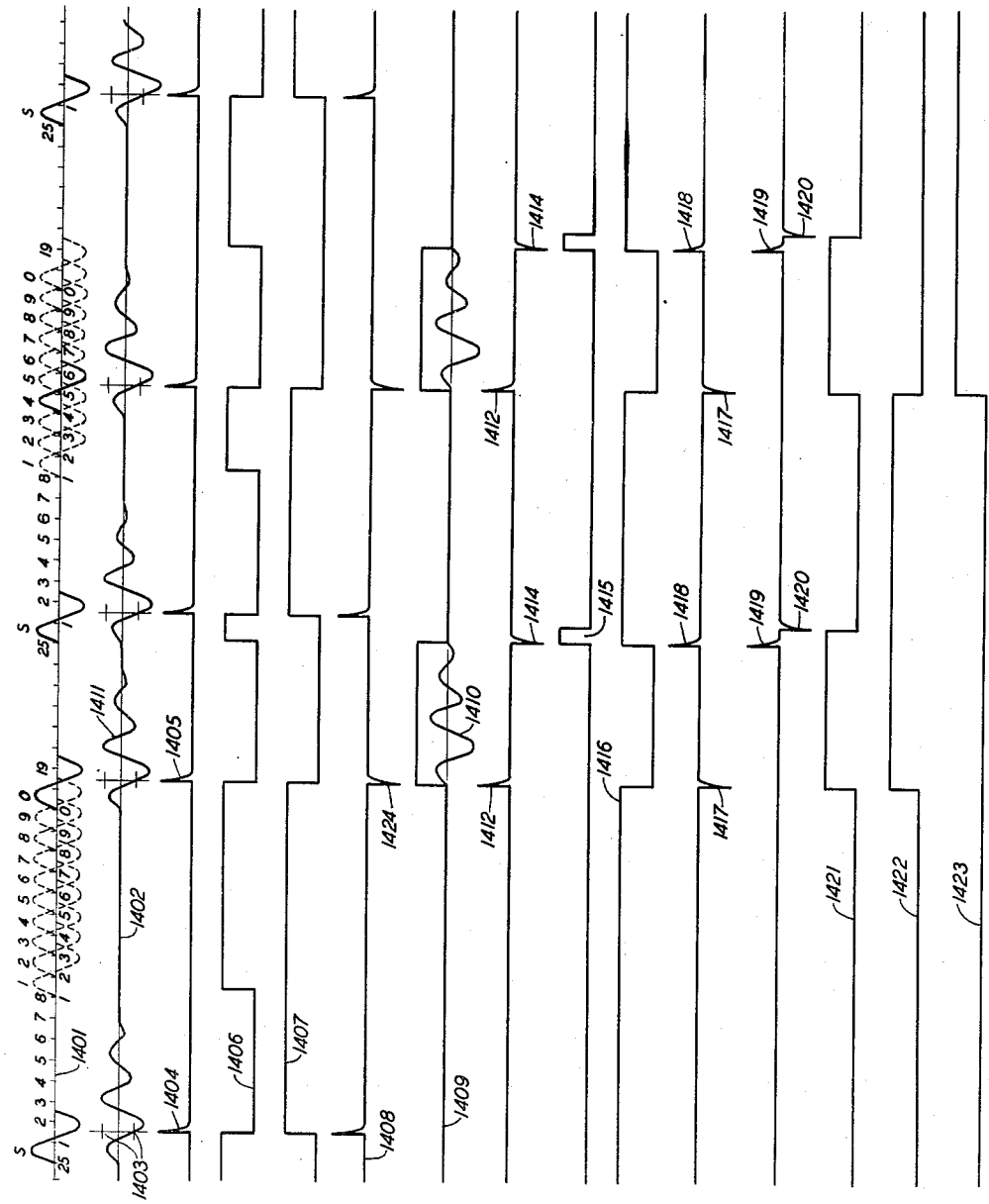

The foregoing and other objects and other features of this invention, the novel features of which are pointed out in the claims appended hereto may be more readily understood from the following description of an exemplary embodiment of this invention when read with reference to the attached drawings in which:

Fig. 1 outlines broadly certain elements of an exemplary system and the manner in which they cooperate one with another;

Fig. 2 shows the manner in which Figs. 3 through 12 are positioned adjacent one another;

Figs. 3 through 12 when positioned as shown in Fig. 2 show in detail the various circuits of an exemplary embodiment of the invention; and Figs. 13 and 14 show graphs of the voltages or currents at various points in the system.

The exemplary embodiment set forth herein is arranged to cooperate with pulse transmitting equipment for transmitting calling signals such as disclosed in the above-identified application of Parkinson the disclosure of which is hereby made a part of the present application by reference to the same extent as if set forth in full herein.

The receiver in accordance with the exemplary embodiment of the invention described in detail herein is arranged to form a part of and cooperate with the other elements of a complete telephone switching system of the type disclosed in a patent application of Malthaner filed on or about June 29, 1948, Serial No. 35,925. The disclosure of the above-identified Malthaner application is also hereby made a part of this application by reference to the same extent as if the disclosure of said application were set forth in full herein.

As shown in Fig. 1 the incoming line 101 normally terminates at a resistor 102. This resistor properly terminates the line and tends to suppress stray currents and transients which may be received from the incoming line due to switching and other disturbances. When it is desired to receive incoming signals the receiver is conditioned by operating switch 108 or by automatic equipment which applies ground to lead 109 and causes relay 105 to operate.

The line 101 incoming to the receiver at this time is extended to the subscriber's station through suitable switching circuits and devices and over the subscriber's line from the central station to the subscriber's station. For purposes of receiving signals or calling pulses from the subscriber's station from calling apparatus such as disclosed in the above-identified application Parkinson et al., the paths from the central station to the subscriber's station need not transmit direct current. It is sufficient if this line will transmit voice frequency currents having a bandwidth of from approximately 300 cycles to 2,000 cycles. This bandwidth, of course, may be wider or narrower in certain cases but such a width is suitable and frequently encountered in telephone networks.

The circuit for the operation of relay 105 extends from battery through the winding of relay 105, back contacts on relays 141 and 142 to ground through the operated contacts of key 108 or to other ground applied to the same conductor by means of automatic switching circuits of the type disclosed in the above-identified application of Malthaner. Relay 105, in operating, completes an obvious circuit for operating the message register 143 for recording the total number of calls. Relay 105 in operating interrupts the holding circuit of relay 144 and permits relay 144 to start to release. Relay 144 is, however, a slow-release relay and requires appreciable time to become fully released.

The operation of relay 105 removes ground from a conductor extending to the automatic volume control circuit 111. This ground normally maintains the gain of the volume control circuit at its maximum value so that the automatic volume limiting operation is ineffective. However, upon the operation of relay 105, the automatic volume control circuit is enabled. A short interval of time thereafter the volume control circuit 111 has regulated the output volume so that it will be at a predetermined value substantially independently of the level of the applied signals.

The operation of relay 105 also transfers the incoming line 101 from the terminating resistor 102 to the band-pass filter 110. The band-pass filter 110 is provided to prevent low frequency power currents, which may be supplied to actuate the calling device of the subscriber's station over the subscriber's loop, from interfering with the operation of the receiving equipment described herein. The band-pass filter 110 also is employed to prevent high frequency signals or high frequency components of noise or other interfering signals or stray currents from interfering with the operation of the receiving equipment described herein.

From the band-pass filter 110 the signals are transmitted through the automatic volume control circuit 111. The signals are transmitted in two directions from the automatic volume control circuit 111; (1) through the recording amplifier 112 to the magnetic recorder 113; and (2) to the controlling amplifiers in other control circuits. As shown in Fig. 1 the signals are first transmitted to a detector 115 which is employed to detect the incoming pulses or other signaling currents. A disabling circuit 116 is provided for disabling the detector 115 in rendering it non-responsive to the incoming pulses.

The exemplary system set forth herein is arranged to respond to and cooperate with equipment for transmitting signals of the type set forth in the above-identified applications of Malthaner, Malthaner et al. and Parkinson. Briefly these signals comprise a plurality of pulses separated by blank intervals or pauses to distinguish a complete set of pulses or signals representing a complete subscriber's designation. These signals are transmitted over and over again from the transmitter equipment or calling apparatus and the subscriber's station as set forth in the above-identified application of Parkinson.

Each complete subscriber's designation usually comprises a subscriber's line number which is frequently followed by a party designation where party lines are employed. In large cities or more densely populated regions the above numbers are preceded by one or more designations defining central offices or switching points.

In the exemplary embodiment set forth herein, it is assumed that the complete subscriber's designation comprises three characters or digits designating the switching center of the called subscriber, four digits or other identifying characters designating the subscriber's station, followed by one character designating the party in case of a party line. This complete designation is followed by a pause equivalent to the time required for the transmission of two of the characters or digits. The pulses as transmitted comprise substantially a single cycle of an alternating-current wave which is assumed to be of the order of 1,000 cycles. Two such pulses are required to define each character of the digit of the complete subscriber's designation.

When each of these pulses is transmitted over voice frequency communication channels and particularly when transmitted through filters and carrier current systems having bandwidths of the order described above, each pulse as received at the receiving station and applied to the detector circuit 115 comprises a transient of a duration which is of the order of three or three and one-half milliseconds. In other words the original pulse of one millisecond as applied to the transmission system by the subscriber's equipment is lengthened so that appreciable energy is received for approximately three to three and one-half milliseconds by the receiving equipment.

In order to prevent the pulses from interfering with one another it is necessary to separate the pulses by a time interval greater than the decay time of each pulse at the receiver. Thereafter the next succeeding pulse may be transmitted. The time thereafter at which this pulse is transmitted is controlled by the character of a symbol or digit represented by the two pulses. In the exemplary embodiment set forth herein, it is assumed that the second or stop pulse of each digit will be transmitted in any one of a plurality of times succeeding one another by approximately a half millisecond. In one specific embodiment each of these times was .44 millisecond. After the final pulse is transmitted representing the magnitude of the digit or character of the symbol, the next succeeding start pulse of the following digit or character is transmitted approximately three and one-half to four milliseconds after the final possible position of the stop pulse.

In order to more readily refer to the time required for each of the digits to be transmitted, this time has been divided up into 25 divisions or units of approximately a half-millisecond duration. In addition eight such units are allowed for each of the pulses to be received and decay to such a value that they will not interfere with the next succeeding pulse. Such an arrangement permits ten different digits or symbols to be represented in each one of the digit intervals. As pointed out above eight such digit intervals are required in the exemplary embodiment set forth herein to represent a complete subscriber's designation. They are followed by a blank or pause of two such intervals so that the complete subscriber's designation is completed in ten of such intervals.

A disabling multivibrator 116 is arranged so that it will disable the detector 115 for approximately three and one-half milliseconds or seven of such intervals. This renders the detector circuit less subject to false operation by noise and other stray signals and thereby improves the operation of the system. Thus after each pulse is received by the detector 115 the disabling multivibrator 116 operates and disables the detector for an interval of time during which the transients resulting from the pulse die out. The output of the detector 115 is transmitted to start circuit 121 and to a gate circuit 117. The start circuit 121 is employed to respond to the incoming pulses and recognize the long pause occurring between the pulses designating the called subscriber's station. Until the long pause is received and recognized by the start circuit, the gate circuit 117 is rendered ineffective.

On the recognition of the pause between the signals representing complete subscriber designations the start circuit 121 conditions the steering circuit 125 so that it will properly direct the information of the first pulses to the proper registering or recording circuit 127. The start circuit 121 also conditions the gate circuit 117 so that it will properly direct the pulses received by the detector circuit 115 to the pulse absorbing circuit 118.

In the meantime, however, as pointed out above, the incoming signals from the volume limiting amplifier 111 are transmitted through a recording amplifier 112 and applied to a delay apparatus. This delay apparatus is arranged to provide a plurality of different delay intervals which intervals are equal to or a function of the expected possible different time intervals between the signals or pulses. This delay apparatus may take any suitable form such as a tapped delay line or network, a plurality of different delay networks, recording and storage devices or a magnetic device as set forth in the exemplary embodiment of this invention set forth herein.

This magnetic recording device 113 operates in substantial synchronism with the incoming signals and records all of the signals applied to it. These signals are stored for a short interval of time and then erased after which additional signals may be then stored in the same magnetic material. The magnetic storing device is shown in detail in Fig. 5. The magnetic material comprises a disc 501 which is continuously operated by synchronous or other type of speed regulated motor and is provided with erasing magnet 510 and a plurality of recording and pick-up magnets. These magnets are spaced around the periphery of the disc 501 so that a recorded signal stored in the disc travels a distance accurately related to the possible times at which pulses may be transmitted over the system.

Figure 5:
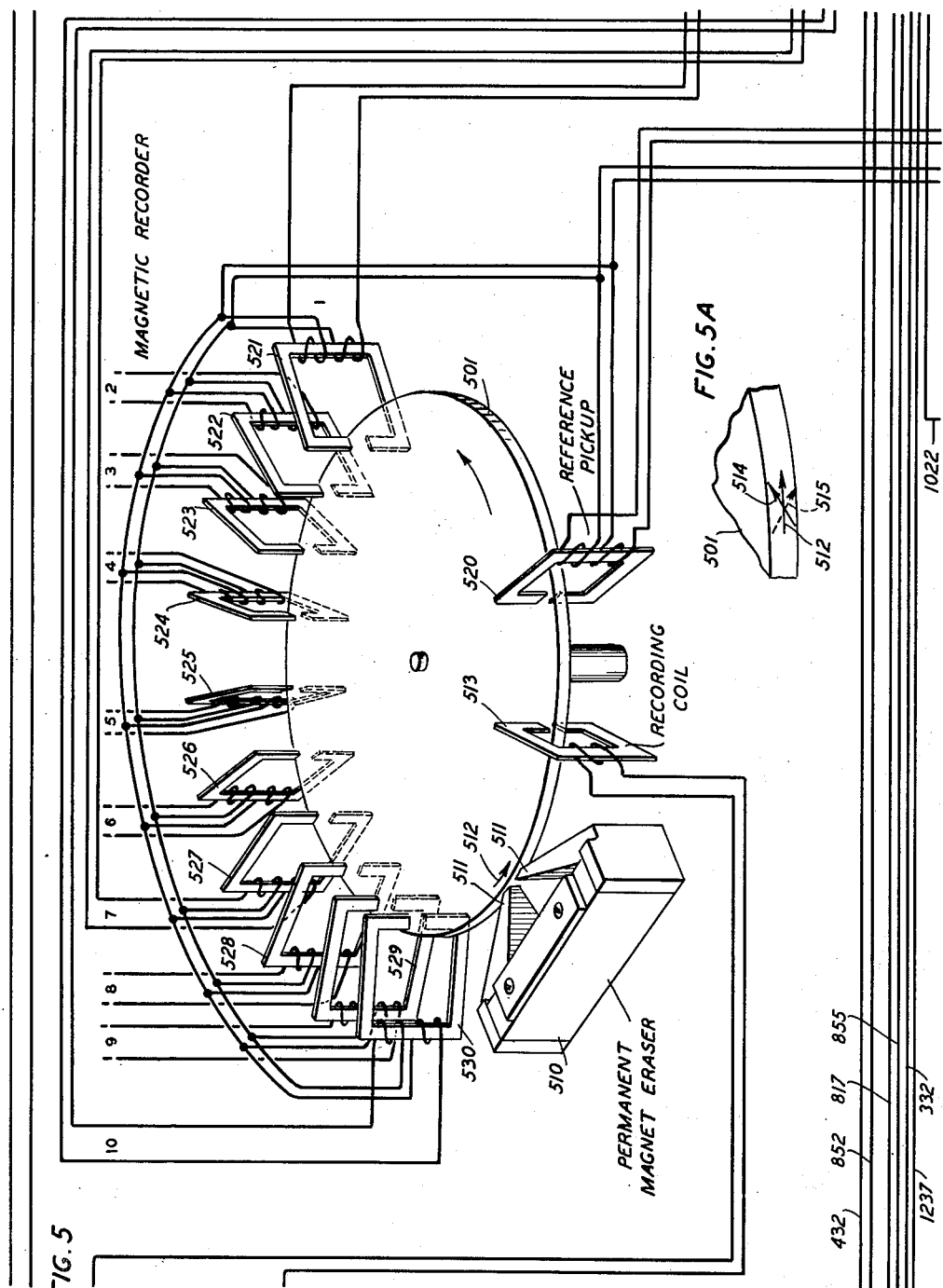

Referring now to Fig. 5, a continuously rotating disc 501 consists of magnetic material suitable for recording magnetic conditions therein. The disc 501 is continuously rotated by a synchronous motor or by any other suitable device, motor or mechanism (not shown) at a uniform precalculated speed.

Magnetic material of the type suitable for use in magnetic recording of electrical signals are frequently called hard magnetic materials because they are mechanically hard and have a relatively high residual induction usually called $B_r$ and a relatively high coercive force $H_c$. As shown in the drawing the disc 501 is rotated past the erasing head 510 which comprises a permanent magnet and pole-pieces 511 by which the field of the permanent magnet is conveyed to the periphery of the rotating disc 501. The field from the permanent magnet induced in the rotating disc 501 should saturate the disc sufficiently to erase all previous magnetic variations within the magnetic material of the disc and leave the material magnetized with the residual magnetic induction oriented tangential to the disc. During the time that each portion of the disc is in the field of the permanent magnet of the erasing head and after it leaves the field of the erasing head the direction of magnetization of each elemental recording portion of the disc is indicated by the arrow 512 in Fig. 5 and by arrow 512 in Fig. 5A. The uniformly magnetized portions of the periphery of the disc then pass through the recording head or between the pole-pieces of the core of coil 513. At this time a transverse magnetic field is induced in the disc at right angles to the direction of magnetization 512. The transverse field is induced by coil 512 as will be evident by examination of the drawing. The coil 512 has pole-pieces adjacent opposite sides of the disc and causes a field to be induced between these pole-pieces either vertically upward or vertically downward as viewed in Fig. 5 and thus at right angles to the direction of rotation of the disc and at right angles to the residual magnetic induction in the magnetic material of the disc. As a result the residual magnetism within the disc is rotated in either direction as the material of the disc leaves the recording head 513. When the magnetic field is upward in the recording coil 513, the magnetic induction within the magnetic material of the disc is rotated in a counter-clockwise direction such as illustrated by the arrow 514 of Fig. 5A. When the magnetic field due to the recording coil 513 is downward, the magnetic induction within the material of the disc after it leaves the recording field is rotated downward as shown by the dotted arrow 515.

It is thus evident that the magnetic field within the material of the disc as oriented by the recording head has a vertical component which may be in either direction and which vertical component may be employed to generate voltages in pick-up heads in a known manner.

It is also evident that fields due to both positive and negative currents are recorded in the disc by moving the magnetic vector or direction of magnetization in the disc in opposite directions. Consequently no bias is required. It is evident that in such an arrangement the relation between applied recording field and the recorded effect is relatively linear over a wide range of magnetic amplitudes and thus over a wide range of signal amplitudes applied to the recording head.

It has been assumed in the foregoing description that the disc of the magnetic material 510 is solid and made up entirely of magnetic material. It is to be understood, of course, that any suitable structure of suitable magnetic material for recording signals may be employed including discs, ribbons or other structures which are either solid and comprise essentially all magnetic material or they may comprise electrodeposited or otherwise plated metals or alloys, either in the form of discs, ribbons or the like. In addition, the disc or other form of magnetic material may consist of one of various magnetic oxides and other magnetic powders incorporated on a paper or film base or have any other suitable structure or may be of any other known type of magnetic recording material. In addition, other forms of wipe-out methods and apparatus may be employed.

As shown in Fig. 5, after passing recording head 513 the magnetized material of the disc 501 passes between the pole-pieces of a pick-up head 520 and then successively past the pole-pieces of ten different pick-up devices or heads. Each pick-up device, in the exemplary embodiment, comprises a magnetic core with pole-pieces which extend adjacent to the periphery of disc 501. The pole-pieces are usually of thin magnetic material located so that the thickness or smallest dimension is parallel to the direction of motion of the magnetic recording medium. Each core is also provided with two windings connected as shown in the drawing to the other elements of the signal receiver described hereinafter.

The spacing between the various pick-up leads determines the actual time delay of the signals because with wider spacing more time is required for an elemental portion of the disc to pass from the pole-pieces of one pick-up to the pole-pieces of the next pick-up. Thus, the spacing between the reference pick-up 520 and the first one of the digit pick-ups 521 is equivalent to the time required for a pulse and its related transient to die out and be reduced to such a value that it does not interfere with any of the succeeding pulses. The spacing between each of the code or digit pick-up coils 521 to 530 inclusive, is approximately half a millisecond or in other words equivalent to the time difference assigned to digits of different magnitudes.

Thus, assume that a start pulse is recorded by the recording coil and a stop pulse is subsequently recorded in the tenth or zero position. The start pulse then passes under the reference pick-up coil 520 and induces voltages in the windings of this coil. The recorded start pulse will then pass successively between the pole-pieces of each of the digit pick-up coils 521 to 530. When this start pulse passes through the pole-pieces of the zero coil 530 the stop pulse will be passing between the pole-pieces of the reference pick-up coil 520.

If, as assumed for the second digit the stop pulse arrives during the fourth digit interval, indicating a magnitude of four for the second digit, then the start pulse of the second digit will be passing under the fourth digit pick-up coil 524 at the time the stop pulse of the second digit is passing between the pole-pieces of the reference pick-up coil 520.

Referring now to Fig. 1, incoming signals from line 101 are transmitted through the band-pass filter 110 and the automatic volume control circuit 111 and applied both to the magnetic recorder through the recording amplifier and to the detector circuit 115. The detector circuit is controlled by the disable multivibrator 116 so that it cannot respond to pulses closer together in time than approximately three and one-half to four milliseconds. The output of the detector is applied to the start circuit 121 and to the gate circuit 117. The gate circuit, however, at this time is closed so that the pulses applied to it perform no useful function. The pulses from the detector 115 are applied to the start circuit and maintain the start circuit in its initial condition until the pause or blank interval between the groups of signals representing complete subscribers' designations are received.

When this blank interval is received, start circuit 121 responds to it near its end and conditions the steering circuit 125 so that it will direct the information received during the succeeding digit interval to the A digit register 127.

The start circuit in responding to the blank interval near the end thereof conditions the gate circuit 117 so that it will transmit pulses from the detector circuit 115 through it to the pulse absorbing circuit 118. The first start pulse thereafter, which will be the first start pulse of a complete subscriber's designation, is then transmitted through the gate circuit 117 to the pulse absorbing circuit 118. The pulse absorbing circuit 118 absorbs this pulse. The pulse, however, is recorded by the magnetic recorder as described above, thereafter, the start pulse passes the reference pick-up and induces a voltage in it, but the reference amplifier is rendered ineffective at this time so that it does not respond to this voltage. The start pulse then passes between the various other digit pick-up coils in succession and induces voltages in these coils. However, the integrating apparatus as well as the reference amplifier are unresponsive to voltages induced in the pick-up coils until a stop pulse is received.

A stop pulse, of course, will be received at some time before the start pulse has passed between the pole-pieces of the last of the digit pick-up coils.

Upon reception of the stop pulse, the detector 115 responds to it and the pulse passes through the gate circuit 117 to pulse absorbing circuit 118. Pulse absorbing circuit 118 does not absorb the stop pulse. It merely absorbs the start pulses. A pulse is transmitted from the pulse absorbing circuit 118, upon the reception of the stop pulse, to the integrating control circuits 122. The integrating control circuit conditions the integrating circuits through the reference amplifier 119 so that the integrating circuits integrate the rectified output of each of the pick-up coils. These integrating circuits in this exemplary embodiment comprise full-wave rectifier circuits which are employed to charge condensers.

When the integrating control circuit 122 is actuated to cause the integrator 114 to integrate, the output of each of the pick-up coils, the recorder stop pulse is starting to pass through the pole-pieces of the reference pick-up coil 520 and the start pulse is likewise starting to pass through the pole-pieces of some one of the digit or channel pick-up coils. The reference amplifier is rendered active at this time and connected to all of the potential pick-up coils in such a manner that the voltage induced in the pick-up coil where the start pulse is starting to induce a voltage therein is in opposition to the voltage applied thereto from the reference amplifier so that the two voltages tend in a large measure to cancel one another. In all of the other pick-up coil circuits, the full magnitude of the stop voltage pulse is applied to the integrating circuits with the result that a large voltage is built up across the condensers associated with all but one of the channel integrating circuits. The integrating time interval, that is, the time during which the integrating control multivibrator 122 renders the integrating circuits and reference amplifiers effective may be of any suitable period. In the exemplary embodiment set forth herein this period is the time interval of a received pulse, that is, from three and one-half to four milliseconds or eight of the increments or units, described above, out of the digit interval assigned to the digit. At the end of this time interval, the integrating circuits and reference amplifier are again rendered unresponsive to signals from the magnetic recording devices and a read pulse is generated in the read circuit 123. This pulse is applied to a recycle circuit 120 and also to the integrating circuits 114. This pulse causes the integrator which has a voltage less than a predetermined amount stored upon it from an integrating condenser to actuate storing apparatus and if the storing apparatus associated with more than one of the digital channels is actuated or if none of such apparatus is actuated then the recycle circuit 120 is set into operation and the circuits reconditioned to respond to the next blank interval in the manner described above. However, if the storage apparatus associated with only one of the integrating devices is actuated is response to the read pulse the equipment is not recycled. The end of the read pulse reset circuit 124 is actuated which restores the charge in the integrating circuits to their initial values so that they will be available for use in responding to the succeeding pulses of the succeeding digit. During the read interval, as described above, the output of the integrator circuits are also transferred to the register circuit 126 which may comprise any suitable number of registers. As shown in the drawing, three such registers have been provided and the operation of the integrating circuit in response to the start and stop pulses of the first digit after the blank interval will be stored in the register circuit 127. In the specific embodiment set forth herein this register circuit is arranged to translate the code representing the various digits.

Thereafter, the next start pulse will be received and actuate the circuits in the manner similar to that described above. The next stop pulse which will be the second one will again actuate the circuits and cause the integrating circuits 114 to operate in the manner described above. At this time the steering circuit 125 will cause the information to be recorded in the translating and recording circuit 128. The information of the succeeding digits will be transmitted to and recorded by the succeeding registers such as 129, and any additional registers for recording additional digits which may be required for control of the circuits at any of the switching centers. If the recording and storing devices associated with one and only one of the various integrating devices respond to each digit, the steering circuit at the end of the reception of the number of digits required actuates disabling circuit 116 so that it will disable detector 115 and prevent it from responding to subsequently received pulses. In addition, the digit steering circuit causes relay 142 to be actuated, which relay causes circuits to respond to transfer the setting of the registers in register circuit 126 to the register circuits 130 to 132, inclusive. The output of these registers may be observed by means of lamps and checked by checking relays and keys 133. The checking relays and keys 133 comprise a group of keys which are set in accordance with the expected subscriber's number or station designation. The relays are operated in accordance with the recorded designation. If the relay corresponding to the operated keys and only the corresponding relays operate one circuit is completed by this equipment 133; otherwise another circuit is completed by it.

If the code has been properly received, the OK register 134 is actuated which causes relay 137 and in turn relays 138 and 145 to be operated. Relay 145 in operating causes the circuits of the system to be restored to the conditions in which they were after the first pulse is received after the system is connected to a subscriber's line. If the several digits for which the keys have been set have not properly been received, the error register 135 is actuated and provided key 107 is operated to the position shown the circuit will again advance as described above. If, however, key 107 has been operated, the system will stop in response to an error and may be advanced only by operating key 106 whereby the circuits are advanced as described above, and are then in condition for responding to another series of pulses representing a complete designation of the called subscriber.

If the integrating circuits do not respond to the read pulse in the proper manner, that is, if the recording equipment is associated with more than one integrating device or if none of these recording equipments respond to the read pulse then the entire circuit is recycled and the previously recorded digits are discarded. Thereafter the circuits will respond to a succeeding group of pulses representing the complete designation of the called subscriber in the manner set forth above. The digital indications stored in the register circuits 130, 131 and 132 or the register-ing and translating circuits 127, 128 and 129 may be employed to actuate automatic switching equipment selectively in any desired or suitable manner. One such arrangement is described in the above-identified application of Malthaner.

The above described operation as generally described, may be more readily understood from the following description in detail, of the elemental details of the system shown in Figs. 3 through 12 when arranged adjacent one another as shown in Fig. 2 and also with reference to Figs. 13 and 14 which show graphically the current and voltage conditions at various places in the system.

Assuming now that the calling transmitting device 301 of the subscriber station has been connected over the subscriber's line 302 to the terminal and switching equipment 303 to the receiving apparatus shown in Fig. 3. The terminating and switching equipment may include any suitable types of manual or automatic switching circuits, apparatus or systems. It is further assumed that ground is applied to conductor 901 either by means of key 902 or by means of the switching equipment which connects the receiver to the subscriber's line such as represented by 303. When ground is applied to conductor 901 the circuit is completed for the operation of relay 810 from the ground connected to conductor 901 through the lower break contacts of relay 814 and the upper break contacts of relay 815 to battery through the winding of relay 810. Relay 810 operates and interrupts the operating circuit of relay 812 which relay thereupon releases after a short interval of time. Relay 810, operated, completes an obvious circuit for the operation of the total calls register 816 which records the total number of calls received by the equipment shown in Figs. 3 through 12, inclusive. Operation of relay 810 also removes the terminating resistance 813 from the incoming line and connects the transmission path from the terminal equipment 303 to the band-pass filter 304 so that the subsequent signals will be transmitted through this filter to the terminating resistance 305 and also through the input transformer 310 to the amplifier equipment shown in Fig. 3.

Operation of relay 810 also removes ground from the conductor 817 which extends through Figs. 7, 6, 5 and 4 to the upper terminal of condenser 318 of Fig. 3 through resistor 331. When ground is removed from the upper terminal of condenser 318, it may assume a negative charge or potential as will be described hereinafter.

Assume further that the calling device 301 is supplied with suitable power either locally or over the subscriber's line, means for doing this being known and that this calling device is set into operation and repeatedly transmits signals of the type described above representing the designation of a called subscriber's station. These signals are then transmitted over the line 302 and then through switching and interconnecting equipment 303 to the band-pass filter 304 through the operated contacts of relay 810.

The subscriber's line 302 may comprise any suitable type of subscriber's line and related equipment capable of transmitting voice frequency signaling currents and any other necessary or desirable supervisory or control currents, these being known. The switching equipment 303 may include any suitable types of switching equipment including manually operated switchboards, automatic switching systems operated under control of dial produced or other types of signaling pulses. Equipment 303 may include other suitable types of interconnecting equipment including toll lines, voice frequency channels of carrier current systems, radio systems and suitable combinations of said systems together with the necessary control and interconnecting equipment. Usually, however, terminal equipment and circuits 303 will include automatic switching equipment as well as a communication path through it to the receiving equipment to be described herein in detail.

The band-pass filter 304 is arranged to pass a frequency band of approximately 300 to 2000 cycles. This band-pass filter accomplishes two purposes. In the first place by suppressing the high frequency currents the operation of the system is made more reliable and less susceptible to misoperation by noise currents which have high frequency components. In addition the lower cut-off of the filter prevents interference from the low frequency power currents which may be transmitted over the subscriber's line to the subset for actuating the calling device located thereat. In these cases the low-pass filter 304 effectively prevents these power frequencies from interfering with the operation of the receiving equipment set forth herein in detail. In case power is not supplied over the signal path, the lower cut-off of the filter still serves to prevent noise interference.

The band-pass filter 304 is terminated by matching resistor 305 and the transformer 310 having two balanced secondary windings. Incoming pulses are applied to the control elements of tubes 311 and 312 in push-pull or phase opposition by means of transformer 310.

Normally, condenser 318 is discharged through break contacts of relay 810 between calls. However, upon the operation of relay 810 as described above, ground is removed from the upper terminal of this condenser which will be charged in the manner described hereinafter. However, so long as condenser 318 is not charged the gains of the amplifier tubes 311 and 312 are maintained at their maximum value.

Tubes 311 and 312 consequently repeat the received signals through the output transformer 313. The signals are then applied to the recording amplifier shown in Fig. 4 and to the rectifier elements 314 and 315. Rectifier elements 314 and 315 are arranged in a full wave rectifier circuit.

These rectifier elements are designated in the drawing as comprising any suitable non-linear rectifier element including copper oxide, selenium, silicon, germanium, etc. These rectifier elements, however, may also comprise any suitable types of tubes including gas-filled tubes and also high vacuum diodes.

By employing two such rectifiers arranged in a full wave rectifier, both the positive and negative portions of the received signals are rectified and contribute to the output of these rectifiers. As a result, whichever one of the positive and negative portions of the received signals is largest will cause the greatest output voltage.

The output voltage from the rectifiers 314 and 315 is connected to the input of the cathode follower tube 316. Tube 316 is provided as an isolation tube and to reduce the current load on the rectifiers 314 and 315. The output of these rectifiers as supplied to the control element of tube 316 is positive with respect to ground so that a positive voltage above ground is repeated in the cathode circuit of tube 316 in response to each of the received pulses. The cathode of tube 316 is connected through a suitable network comprising condenser 325 to the control element of the right-hand section of tube 317. The control element of this tube is biased negatively by means of potentiometer 324 so that no current normally flows through the right-hand section of tube 317.

However, when the amplified output of tubes 311 and 312 as rectified by the rectifiers 314 and 315 exceeds the bias determined by potentiometer 324, current tends to flow in the output circuit of the right-hand section of tube 317. This current causes the anode of tube 317 to become more negative, thus applying negative pulses through the coupling condenser 319 through to cathode of the left-hand section of tube 317. As a result current flows through the anode-cathode circuit of the left-hand section of tube 317 which operates as a diode and applies a negative voltage to the upper terminal of condenser 318.

The time constant of condenser 318 and related resistors requires approximately three or four received pulses for the potential of the upper terminal of this condenser to become stabilized at its steady state condition.

The application of the negative voltage to the upper terminal of condenser 318 reduces the gain of tubes 311 and 312 and thus tends to stabilize the output of these tubes so that the output signals are relatively constant and independent of the amplitude of the received signals.

The inductance 326 is connected in the cathode circuit of tubes 311 and 312 to provide increased negative feedback to high frequency currents and thus decreases the longitudinal amplification.

The output of tube 316 in addition to being applied to the control element of the right-hand section of tube 317 for regulating the gain of the volume control amplifier tubes 311 and 312 is also applied to a control element of tube 320.

Tube 320 is a multielement gaseous discharge tube provided with anode and cathode and two control elements. The control elements are arranged so that discharges are initiated through the tube under the joint control of both of these elements.

The lower control element is shown connected to the anode of the right-hand section of tube 321. The two sections of tube 321 are arranged to form a single stability circuit in which the left-hand section is normally conducting substantially its maximum current and the right-hand section is cut off. As a result the voltage of the anode of the right-hand section will be at a relatively high value and apply sufficiently positive voltage to the lower control element of tube 320 so that discharges may be initiated through this tube in response to positive voltages repeated by tube 316 in response to each received pulse. As a result a discharge will be initiated through tube 320 at this time.

The condenser 327 together with the anode resistance 328 is arranged to provide a self-interrupting circuit which causes the discharge through this tube to be terminated at a predetermined interval of time after it is initiated. The anode of tube 320 is also connected to the control element of the left-hand section of tube 321 and as a result upon the initiation of the discharge through tube 320 a negative pulse is applied to the control element of the left-hand section of tube 321. The application of the negative pulse to the grid of this section of tube 321 interrupts the discharge current flowing through this section and causes current to flow through the right-hand section of tube 321. As a result the voltage on the anode of the right-hand section falls to a relatively low value and reduces the voltage of the lower control element of tube 320. Consequently tube 320 is unable to respond to further positive signaling voltages applied to its other control element by tube 316.

At a later time determined by the time constant of the various resistor condenser combinations associated with tube 321 and due to the fact that the cathode of the right-hand section of this tube is at a more positive value than the normal grid bias applied to this section of the tube, current flowing through the right-hand section of tube 321 is interrupted and a discharge initiated through the left-hand section of the tube. Consequently, after the tube 321 is thus restored to its initial condition, tube 320 is again conditioned to respond to succeeding positive signal voltages repeated by tube 316.

The time required for the circuits associated with both sections of tube 321 to be restored to their initial condition is sufficient to allow the transients, described above forming a part of each of the signaling pulses, to become dissipated and die out so that they do not interfere with the subsequently received signal pulses.

In addition to preventing false operation of tube 320 due to the transient currents accompanying each of the pulses, blocking of this tube by the circuits of both sections of tube 321 renders the operation of tube 320 less susceptible to noise currents. Thus during the blocked interval noise currents are unable to falsely cause discharges through tube 320 and as a result the effects of noise currents are reduced.

Each time a discharge is initiated through tube 320 current flows through the cathode resistor of this tube with the result that the cathode becomes more positive. This positive pulse from the cathode is supplied to the control grid of the left-hand section of tube 322. This tube, however, is biased sufficiently negative at this time so that it is cut off and does not repeat the positive pulse applied to this control grid.

The positive pulse from the cathode of tube 320 is also applied to the inner control element or grid of tube 420 which causes a discharge to be initiated through tube 420. Tube 420 is a gaseous conduction tube and is provided with a network comprising the inductance 423 and shunting resistor 424, condenser 425 and plate resistor 426 in its anode circuit with the result that these elements cause the discharge to be interrupted through this tube a definite and predetermined interval of time after it is initiated. The bias applied to the control element of tube 420 by the resistor 427 is such that a discharge will be initiated through tube 420 each time a discharge is initiated through tube 320.

Each and every discharge through tube 420 causes condenser 425 to be discharged so that the voltage of its upper terminal is returned to substantially one and the same predetermined value when the discharge through the tube 420 is finished. Between discharges, the voltage of the upper terminal of condenser 425 becomes positive due to the charging of this condenser through relatively high resistance 426. The longer the interval between the discharges of tube 420, the higher the voltage becomes upon the upper terminal of condenser 425. As pointed out above, a discharge is initiated through the tube 320 and thus through tube 420 for each received pulse. These discharges occur sufficiently rapidly so that the upper terminal of condenser 425 does not become charged to a sufficiently large positive voltage to cause the transfer of the discharge in the tube 421 from the right-hand anode to the left-hand anode until the blank interval or long pause between the pulses representing complete subscriber station designations is received. However, during the pause between the pulses representing each complete subscriber's designation the upper terminal of condenser 425 becomes charged to a much greater positive potential. As a result, the circuits of tube 421 are actuated.

The two sections of tube 421 are interconnected to form a double stability circuit in which either section will remain conductive and the other section non-conductive until changed by the application of signal pulses thereto as will be explained.

When the receiver is not connected to a source of signals or pulses and after power has been applied thereto, tube 420 will be non-conductive and as a result, the upper terminal of condenser 425 will be charged to a relatively high positive potential. This charge causes a discharge to be initiated through the left-hand section of tube 421. Of course, if a discharge is already flowing through this section, a discharge will merely continue to flow. The discharge flowing through the left-hand section of tube 421 interrupts any discharge flowing through the right-hand section of this tube and maintains the discharge through the right-hand section interrupted due to the action of the common cathode resistor.

Upon the application of the first received pulse to the control element of tube 420 in the manner described above from tube 320, a discharge is initiated through tube 420 which discharge causes the condenser 425 to be discharged so that the voltage of the upper terminal thereof falls to a relatively low value. Inasmuch as the control element of the left-hand section of tube 421 is connected to the upper terminal of condenser 425, the voltage of this control element also falls to a relatively low value and interrupts the discharge current flowing through the left-hand section of tube 421.

Interruption of discharge through the left-hand section of tube 421 causes the voltage of its anode to rise and apply a more positive voltage to the control element of the left-hand section of tube 422. Tube 422 has both sections interconnected in another double stability circuit such that current may flow through one or the other sections, but not both sections. Inasmuch as the left-hand section has been previously conditioned to conduct current at the end of the previous call, in the manner described hereinafter, the application of a positive pulse to its control element from the anode of the left-hand section of tube 421 produces no appreciable effect by way of change of current flow in any of its circuits at this time.

After the receiver, shown in the drawings, has been connected to a subscriber's line and the first pulse received therefrom in the manner described above, the first pulse as well as the succeeding pulses, discharge and maintain the condenser 425 discharged so that the voltage of its upper terminal is relatively low, consequently, the voltage of the control element of the left-hand section of tube 421 is also maintained at a relatively low value so that no current flows through this section of tube 421. Current continues, however, to flow through the right-hand section of this tube. So long as pulses are received sufficiently close together, the circuits then remain in the condition described until the blank interval or long pause between the pulses representing a complete subscriber's designation is received.

Sometime near the end of this long pause or blank signal, the upper terminal of condenser 425 becomes charged to a sufficiently positive voltage so that the voltage of the control element of the left-hand section of tube 421 becomes sufficiently positive to initiate a discharge through the left-hand section of this tube. The initiation of the discharge through the left-hand section of tube 421 interrupts the discharge flowing through the right-hand section of this tube and applies a negative pulse to the control element of the left-hand section of tube 422.

The interruption of the discharge through the left-hand section of tube 422 at this time causes current to flow through the right-hand section of tube 422 which current tends to maintain the left-hand section interrupted and applies a controlling voltage to the gating tube 322 and to the steering circuit shown in Fig. 12.

The anode resistor 429 of the left-hand section of tube 422 has a relatively low resistance while the anode resistor 430 of the right-hand section of this tube has a relatively high resistance, consequently, a greater current flows through the left-hand section of tube 422 then through the right-hand section so that upon the initiation of a discharge through the right-hand section of this tube its cathode becomes less positive due to the lesser current flowing through the common cathode resistor 431. This effective negative pulse is applied to the control element of the right-hand section of tube 1222 (over conductor 432) and is repeated by this section as a positive pulse to the control element of tube 1215. Tube 1215 is a gas-discharge tube. An application of a pulse to its control element initiates a discharge through the tube which discharge continues to flow until interrupted in the manner described hereinafter.

The creation of a discharge through tube 1215 applies a positive voltage from the cathode of tube 1215 to the cathode of tube 1214 through the coupling condenser 1235. If a discharge has previously been flowing through tube 1214, the voltage applied to its cathode through coupling condenser 1235 is sufficient to interrupt the discharge flowing through this tube.

The interruption of the discharge through the left-hand section of tube 422 causes the voltage of the anode of this section to rise to a much higher voltage, which higher voltage is applied to the coupling resistor network 329 to the control grid of the left-hand section of tube 322. This higher biasing voltage applied to the control grid of the left-hand section of tube 322 causes the grid of this tube to be conditioned to thereafter repeat positive pulses from the cathode of tube 320 to the grids of both sections of tube 323.

The circuits are now conditioned to respond to the first pulse of a complete set of pulses representing the called subscriber's station designation. When the first pulse of this designation is received, it will be a start pulse and will cause a discharge to be initiated through tube 320 in the manner described above. The discharge through tube 320 causes a positive pulse to be applied to the control element of the left-hand section of tube 322, which pulse is repeated as a negative pulse in the anode circuit and applied to the control elements of both sections of tube 323. The sections of tube 323 are connected in a double stability circuit such that either of these sections may be conducting, but not both. At the end of the previous call, in the manner which will be described hereinafter, a flow of current was initiated through the left-hand section of tube 323 which flow continues until the negative pulse from the output circuit of the left-hand section of tube 322 is applied to the control element of both sections of tube 323 through the coupling condenser 333. The coupling condenser 333 together with the coupling resistor 334 has very short time constants so that the negative pulse applied to the control elements of both sections of tube 323 is of short duration. As a result of this pulse current starts to flow through the right-hand section of tube 323 which current then continues to flow and prevents further current flow through the left-hand section of tube 323 at this time.

Figure 4:
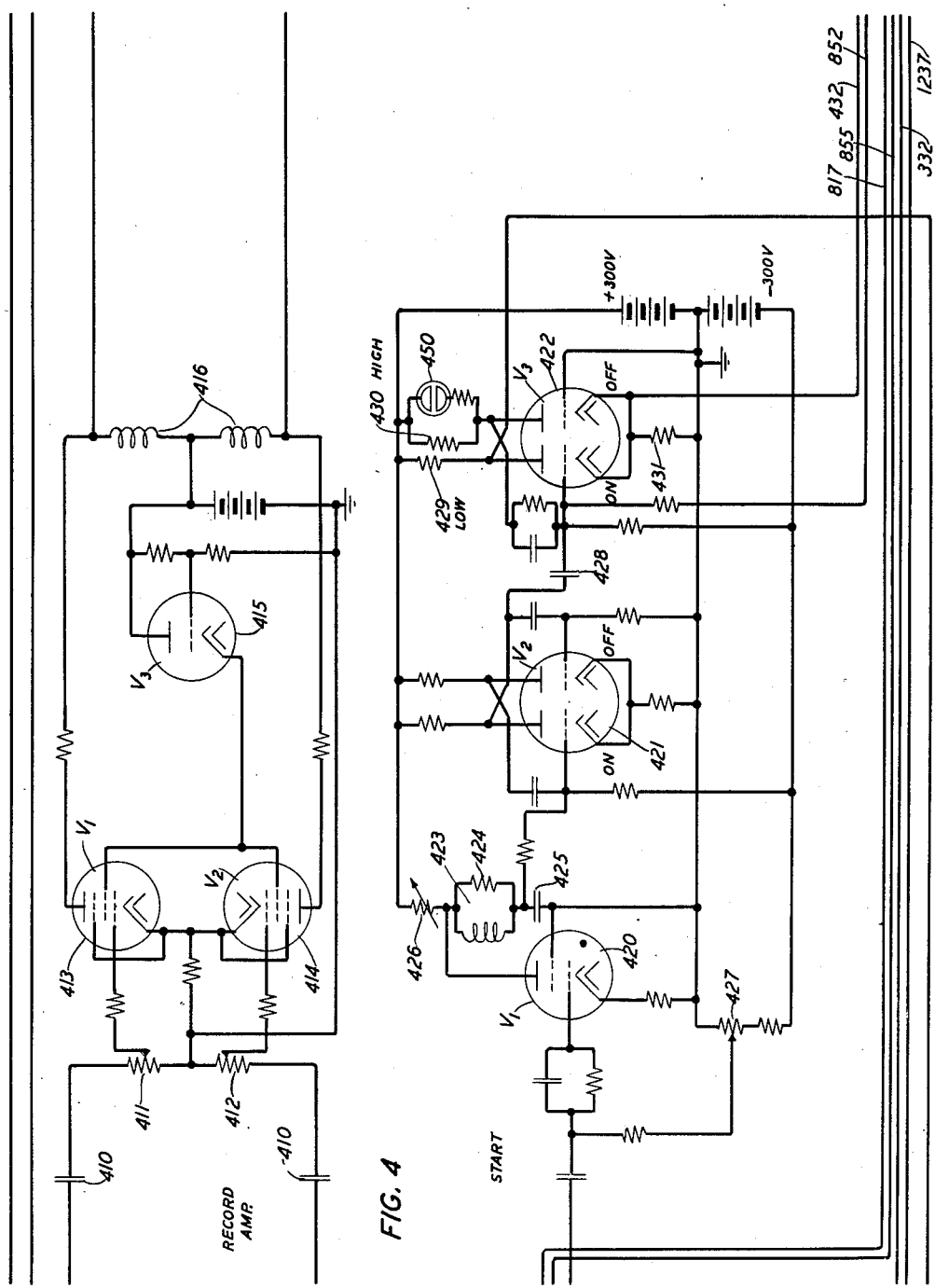
Figure 6:
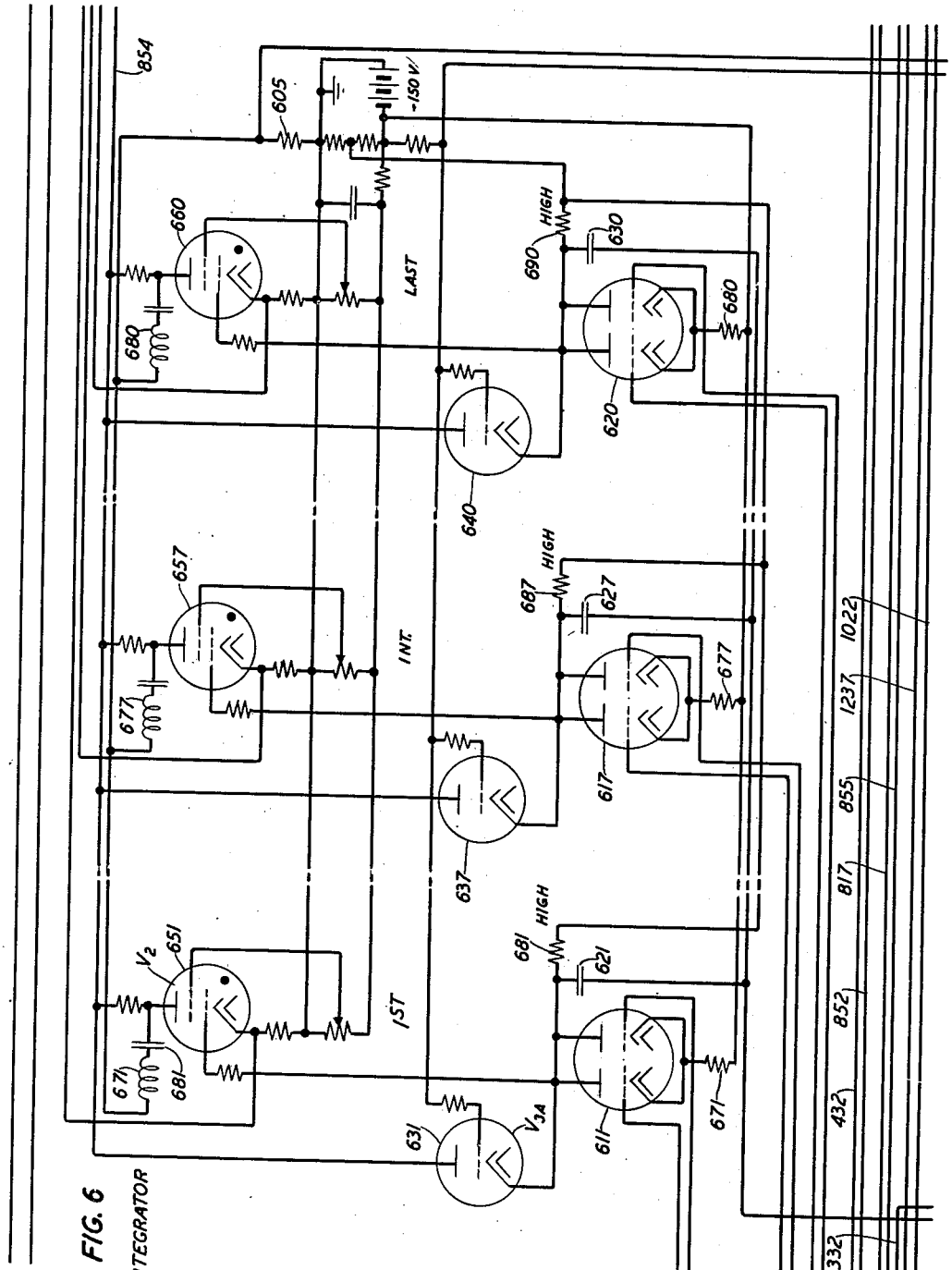

The interruption of the current flowing through the left-hand section of tube 323 at this time causes the voltage of its anode to rise to a relatively high value and apply a positive voltage to the conductor 332 extending through Figs. 4, 5 and 6 to the control element of the left-hand section of tube 1110 through the coupling condenser 1109. The two sections of tube 1110 are connected in their single stability circuit such that either section, but not both sections may conduct current at any instant of time. However, the circuit is connected so that the left-hand section normally conducts current. When this current is interrupted, the right-hand section will conduct current for a predetermined interval of time after which the left-hand section again starts to conduct current and interrupts the current flowing through the right-hand section, thereafter, the left-hand section continues to conduct current until again interrupted by the application of control voltage to it. Inasmuch as current is already flowing through the left-hand section of this tube, the application of a positive voltage to its control element does not further affect the operation of the circuit.

When tube 320 has a discharge initiated through it in response to the first start pulse as described above, a positive voltage is also applied from the cathode circuit of tube 320 to the control element of tube 420 thus causing a discharge current to flow through tube 420. A discharge from tube 420 at this time will discharge the upper terminal of condenser 425 and interrupt the discharge through the left-hand section of tube 421. The interruption of the current flowing through the left-hand section of tube 421 applies a positive voltage to the control element of the left-hand section of tube 422. Tube 422, however, is biased so that the positive voltage thus applied does not initiate a discharge through the left-hand section of this tube. Instead, current continues to flow through the right-hand section of tube 422 until the circuits of this tube are reconditioned and restored to their initial condition as will be described hereinafter.

When a start signal or pulse is received, it is transmitted to the recording amplifier shown in Fig. 4 and applied to the recording coil 513 of the magnetic storing and delaying device shown in Fig. 5. This start pulse together with all of the other received pulses is then applied to the recording coil 513, in addition to controlling the various other tube circuits in the manner described above. Due to the fact that the start pulse in question has been preceded by a blank interval of approximately two-digit intervals the previously recorded pulses have been rotated between the pole-pieces of all of the pick-up coils and then erased by the permanent magnet 510 so that there are no other signals recorded in the magnetic disc 501 when the start pulse is received and recorded by the recording coil 513. The recorded start pulse then passes between the pole-pieces of the reference pick-up coil 520 and then at later intervals of time successively between the pole-pieces of the channel pick-up coils 521 to 530 inclusive. This start pulse induces voltages in each of the pick-up coils which it passes but these voltages are ineffective until circuits are conditioned as will be described hereinafter.

Depending upon the magnitude of the first digit the stop pulse will be received during the time the start as recorded in the disc 501 is passing between certain of the channel pick-up coils. If the magnitude of the first digit is 3, the stop pulse will be received slightly before the start pulse passes between the pole-pieces of the third pick-up coil 523. If the magnitude of the first digit is 5, the stop pulse will be received slightly before the stop pulse as recorded in disc 501 passes between the pole-pieces of the fifth pick-up coil 525. Likewise, if the magnitude of the first digit is any other value, the stop pulse will be received slightly before the start pulse as recorded in disc 501 starts passing between the pole-pieces of the corresponding pick-up coil.

Assume for purposes of illustration that the first digit is 7. Then the stop pulse will be received slightly before the start pulse as recorded in disc 501 passes between the pole-pieces of the seventh pick-up coil which is 527. Up to this time circuits connected to the pick-up coils have been rendered non-responsive to the voltages induced in these coils by the start pulse passing between the pole-pieces of the other pick-up coils.

Upon the reception of the stop pulse this pulse will be transmitted through the volume control circuits, recording amplifier and applied to the recording coil 513. The pulse is thus recorded in the disc 501 and carried through the reference pick-up coil 520. As the stop pulse starts to pass under the pole-pieces of the pick-up coil 520 the start pulse will start to pass under the pole-pieces of the pick-up coil 527.

Meantime, however, other circuits respond to the stop pulse. When this pulse is received and transmitted through the volume control devices 311 and 312 and then through the rectifiers 314 and 315 it causes a positive pulse to be applied to one of the control elements of the tube 320. At this time the blocking tube 321 has again restored to normal so that tube 320 may respond to the stop pulse and have a discharge initiated through it in response to this stop pulse. The stop pulse causes blocking tube 321 to be actuated to its blocking condition so that tube 320 cannot respond to another pulse for 3½ to 4 milliseconds as described above. In addition, tube 320 applies a positive pulse to the control element of tube 420 which responds as described above and discharges condenser 425. The discharge of condenser 425 at this time will cause the circuits of tube 420 to be actuated as described above. The operation of the circuits of tube 420 performs no useful function at this time.

Tube 320 also repeats a positive pulse to the control element of the left-hand section of tube 322 which tube repeats a negative pulse from its output circuit in response thereto. As before, the negative pulse from the anode of tube 322 is applied through the coupling condenser 333 and grid resistor 334 to the grids of both sections of tube 323. This negative pulse interrupts the current flowing through the left-hand section of tube 323 and as a result current starts to flow through the right-hand section of tube 323 due to the energy stored in the coupling circuits between the two sections of tube 323.

When a discharge is initiated through the lefthand section of tube 323 in the manner described above in response to the reception of the stop pulse, the anode of this section falls to a relatively low voltage and in effect applies a negative step voltage to conductor 332. This negative step voltage is applied through the coupling condenser 1109 and grid resistor 1120 to a control element or grid of the left-hand section of tube 1110. A "step voltage" may be defined as a change in a voltage from one finite value to another in a time which approaches zero.

The coupling condenser 1109 is small in magnitude and the resistance of the resistor 1120 is also small so that the product of these two quantities, which is frequently termed the time constant, is also small. Consequently these elements act to differentiate the negative step voltage applied to the lead 323 extending from the anode of the left-hand section of tube 323 to the control element of tube 1110 as described above. Consequently a negative pulse of relatively short duration is applied through the coupling condenser 1109 to the control element of tube 1110. This pulse is of sufficient duration, however, to interrupt the current flowing through the left-hand section of tube 1110. The interruption of current flowing through this section causes its anode voltage to rise and its cathode voltage to fall, with the result that current starts to flow through the right-hand section of tube 1110. Current continues to flow through the right-hand section for a predetermined interval of time depending upon the magnitude of the coupling condenser 1121 as well as the values of various bias potentials and resistances connected to the various anodes and other resistors of the circuit. At the end of the time interval determined by these various constants, current again starts to flow through the left-hand section of tube 1110 which current causes the voltage of the cathode of this section to rise and interrupt the current flowing through the left-hand section of tube 1110. Current continues to flow through the right-hand section of tube 1110 for an interval of time of approximately 3½ to 4 milliseconds which is the time interval required for the complete reception of a signaling pulse as described above.

During the time current flows through the left-hand section of tube 1110 various circuits are conditioned to respond to the voltages induced in the pick-up coils associated with the magnetic storing and delay device shown in Fig. 5.

Upon the interruption of current flowing through the left-hand section of tube 1110 in response to the reception of the stop pulse, the anode voltage of this section rises as described above, and applies a more positive voltage to the control element of the left-hand section of tube 1113. Tube 1113 operates as a cathode follower tube with its cathode connected to the negative 300-volt supply as shown in the drawing. The grid of this section is likewise connected through a leak resistor to the negative 300-volt supply and also to the anode of the left-hand section of tube 1110. Consequently, so long as current continues to flow through the left-hand section of tube 1110 the grid of the left-hand section of tube 1113 and thus its cathode is maintained at a relatively low negative voltage.

Both sections of tubes 1020 and 1021 are connected in an amplifier or repeater circuit having a large negative feedback so that the gain of the amplifier is substantially unity; both for the control or biasing voltages applied to the cathodes of tube 1020 and for the signals applied to the grids of this tube.

The cathode of the left-hand section of tube 1113 is connected to the cathode of both sections of tube 1020 and so long as these voltages are maintained at a relatively negative value, considerable current flows through both sections of tube 1020 causing the anodes of these sections to be maintained at a relatively low value. This voltage is applied to the control elements of both sections of tube 1021 which effectively causes tube 1021 to be cut off so that the cathodes of both sections of this tube are at substantially —200 volts.

The cathodes of both sections of tube 1021 are connected to the windings of pick-up coil 520. The grids of both sections of tube 1020 are likewise connected to the windings of the pick-up coil 520. Consequently, so long as current flows through the left-hand section of tube 1110 and maintains the cathode of the left-hand section of tube 1113 and thus its cathode at a relatively low voltage, tubes 1020 and 1021 do not function as amplifier tubes. However, upon the interruption of the current flowing through the left-hand section of tube 1110 in response to the reception of the stop pulse, a more positive voltage is applied to the control element of tube 1113 thus raising its cathode and thus the cathodes of tube 1020 to a more positive value which in turn causes the voltage of the anodes of both sections of tube 1020 to rise and apply proper opertaing potentials to the grids of both sections of tube 1021. As a result, tubes 1020 and 1021 operate as normal pulse responsive tubes at this time.

The cathodes of both sections of tube 1021 in addition to controlling the bias voltage of the grids of both sections of tube 1020 also control the bias voltages applied to both sections of all of the tubes 611 through 620 of which 611, 617 and 620 are shown in the drawing, it being understood that one of these tubes is provided for each of the channel pick-up coils 521 through 530 inclusive. Normally, so long as the cathodes of tube 1021 are maintained at a relatively large negative voltage as described above, tubes 611 through 620 inclusive have a large negative voltage applied to their control elements which is sufficient to block the tubes or cut them off so that they do not respond to the voltages applied to their control elements from the various pick-up coils. However, upon the raising of the voltage of the cathodes of both sections of tube 1021 in response to the reception of the stop pulse which voltage causes the amplifier tubes 1020 and 1021 to be conditioned to respond to voltages generated in the reference pick-up coil 520 the biasing voltages applied to the control elements of both sections of tubes 611 through 620 is increased to a point where these tubes will act as full-wave rectifiers of the voltages applied to their control elements from the pick-up coils 521 to 530 inclusive.

Storage condensers 621 through 630 are associated with the respective rectifier tubes 611 through 620. These condensers were previously substantially discharged at the end of the previous cycle of operation of the system in the manner described below. Furthermore these condensers are maintained discharged and the voltage of their upper terminals held at a predetermined value by resistors 681 through 690 in the manner described hereinafter until they are charged by the respective rectifier tubes 611 through 620.

The rectified currents from the rectifier tubes 611 through 620 are employed to charge the associated condensers 621 through 630 so that the voltage of the upper terminals of these condensers becomes negative. A relatively high resistance is connected in the cathode circuits of these tubes. These resistances provide negative feedback voltages which increase the effective resistance of the rectifier tubes so that these tubes act as current generators and as a result these tubes together with their associated condensers sum up and integrate the current applied to them during the integrate interval instead of indicating the peak voltage of the pulses as they would with low impedance rectifier elements or tubes.

In addition these resistors reduce the effects of slightly different tube characteristics.

It will be observed that the input of the amplifier tube 1020 is connected to the outer terminals of the windings of the reference pick-up coil 520. At this time tube 1020 is conditioned to respond to these voltages as described above and repeats them and applies them to the control elements of tube 1021 which tube is also conditioned to repeat these voltages as described above. The output path of tube 1021 is connected to its cathodes. Tube 1021 thus operates as a cathode follower tube having a low output impedance. This output is connected to the inner winding terminals of all the pick-up coils including the reference pick-up coil 520 and all of the channel pick-up coils 521 through 530. The low impedance of the cathode circuit in tube 1021 together with the high impedance windings of the respective pick-up coils, provides sufficient decoupling between the windings of the various pick-up coils so that there is substantially no interference between the output circuits of these coils. In other words, voltage induced across one coil as a result of pick-up action will not cause voltage to be induced in other coils due to the common connection of the output windings of the various coils to the cathodes of tube 1021. It is to be noted that the output of the tube 1021 is connected to the inner winding terminals of the reference pick-up coil 520 which voltage is then, in effect, fed back through the pick-up coil winding to the control elements of tube 1020. This circuit comprises a low-loss feedback circuit such that the gain of tubes 1020 and 1021 operating as amplifiers is substantially unity. In other words the voltage applied to the output circuit of tube 1021 from its cathodes is substantially the same as the voltage induced in the windings of the reference pick-up coil 520. This output voltage is applied to the windings of all of the other channel pick-up coils 521 through 530 and thus to the control elements of the rectifier tubes 611 through 620. In the absence of any voltages induced within the various channel pick-up coils 521 through 530, the voltages from the cathodes of tube 1021 are applied to the control elements of all of the rectifier tubes 611 through 620 which voltages are rectified by the rectifier tubes and cause charges to be accumulated in the associated condensers 621 through 630. However, as described above, under the assumed conditions at about the time the stop pulse starts to pass under the pole-pieces of the reference pick-up coil 520 the start pulse starts to pass under the pole-pieces of the channel pick-up coil 527. These pulses pass under the respective pole-pieces substantially simultaneously and in about the same interval of time and because the signals came from a common source and were both acted upon by substantially the same transmission path attenuating all of the various elements thereof, these signals which initiate under control of the two records in the magnetic disc 501 are substantially identical. Consequently voltages having similar wave forms and generally similar amplitudes are induced in the windings of the reference pick-up coil 520 and in the windings of the seventh channel pick-up coil 527. The windings of the pick-up coil 527 and of the reference pick-up coil 520 have been reversed so that the voltages induced in these two pick-up coils tend to cancel one another. Consequently little or no voltage is supplied to the control elements of the rectifier tube 617. However, as described above, substantially the entire output voltage from the reference pick-up coils is applied through the reference amplifier tubes 1020 and 1021 and through respective channel pick-up coils to the respective amplifier tubes 611 through 620. Consequently the storage condensers 621 through 630 associated with the respective rectifier tubes all become charged to a relatively high voltage except the storage condenser 627 associated with tube 617, under the assumed conditions, because substantially no voltage is applied to the control elements of this tube.

If, however, it had been assumed that the pulses of the first digit represented some other digital value than the particular condenser associated with the corresponding one of the rectifier tubes 611 through 620 would not have been charged negatively in the manner described above. The charging of the various condensers continues for the duration of the received pulse. The high resistances 661 through 670 connected in the cathode circuits of the rectifier tubes increases the impedance of these tubes so that the tubes together with the storage condensers sum up or integrate the current during the entire period. Thus the charging of the condenser continues for the time required for the stop pulse to pass between the pole-pieces of reference pick-up coil 520 and the start pulse to pass between the pole-pieces of the last pick-up coil under the assumed conditions.

During the time charges are being accumulated by the condensers 621 through 630 as described above, the control circuits are being further conditioned in response to the reception of the stop pulse so that the digital value represented by this pulse may be properly recorded.

Upon the initiation of a discharge through the right-hand section of tube 1110 in response to the reception of the stop pulse described above, a negative pulse is applied to the control element of the left-hand section of tube 1114 through coupling condenser 1122 and grid resistor 1123. The resistor 1123 and condenser 1122 tend to differentiate or shorten the pulse applied to the control element of the left-hand section of tube 1114.

Both sections of tube 1114 are connected in a double-stability circuit such that current will continue to flow through either section, but not both sections, until controlling voltages are applied to the circuits and elements of the tube to interrupt the discharge through one section and initiate the discharge through the other section of the tube. Normally the tube has been conditioned as described hereinafter at the end of the reception of the previous subscriber's station designation so that current flows through the left-hand section thereof. However, upon the application of a negative pulse as described above current is interrupted through this section and the discharge initiated through the right-hand section of tube 1114.

The interruption of current through the left-hand section of the tube 1114 causes the voltage of its anode to rise to a higher positive value which voltage is applied to the control grid of the right-hand section of tube 1113. This voltage tends to cause the right-hand section of tube 1113 to conduct current and lower its anode voltage to a low value which is slightly less in magnitude than the 150-volts negative with respect to ground to which voltage the cathode of the left-hand section of tube 1113 is connected. When the anode voltage of the right-hand section of tube 1113 falls to a relatively low value the grids of the resetting tubes 631 through 640 have a relatively large negative voltage applied to them with the result that their outputs are substantially cut off and they are prevented from conducting any further current at this time. Consequently these tubes will not interfere with the charging of condensers 621 through 630 in the manner described above.

When current starts to flow through the right-hand section of tube 1110 in response to the reception of the stop pulse as described above the negative voltage change at the right anode is also applied through coupling condenser 1205 to the control element of the left-hand section of tube 1220. This voltage is repeated as a positive pulse in the output circuit of the left-hand section of tube 1220 and applied through individual coupling condensers to the control elements of each of the gaseous conduction tubes 1211 to 1214 inclusive, of Fig. 12. These tubes are arranged in a so-called chain circuit so that only one tube has a discharge initiated in it each time a positive pulse from the output circuit of the left-hand section of tube 1220 is applied to all their control grids. The bias voltage applied to the control elements of tubes 1211 through 1214 is normally sufficiently negative so that no discharge will be initiated through any of these tubes upon the application of a positive pulse from the anode of the left-hand section of tube 1220. However, under the assumed conditions current is flowing through the anode-cathode path of the tube 1215 due to the operation of the circuits as described above. Consequently the voltage at the cathode of this tube is at a higher positive value than the voltage of the cathodes of any of the other of the gaseous condution tubes 1211 through 1214. The cathode of tube 1215 is connected through a resistance network to the control element of tube 1211 thus raising the bias potential applied to its control element to a more positive potential than the bias potential applied to any of the other gas conduction tubes 1212 to 1214 inclusive. The bias voltage applied to the control element of tube 1211 is sufficiently high that a discharge is initiated through this tube upon the application of a positive pulse through its coupling condenser.

Figure 7:
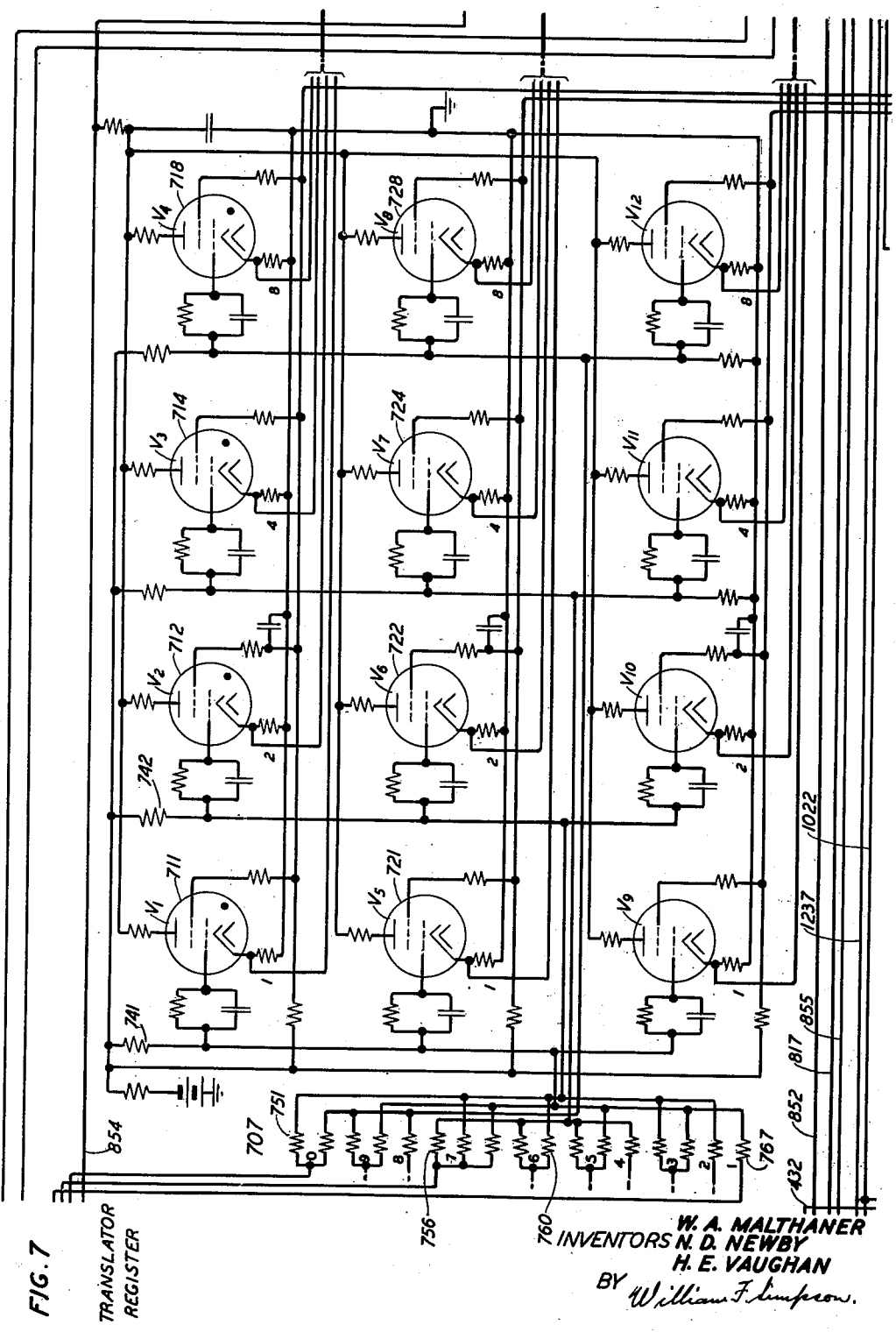
Figure 8:
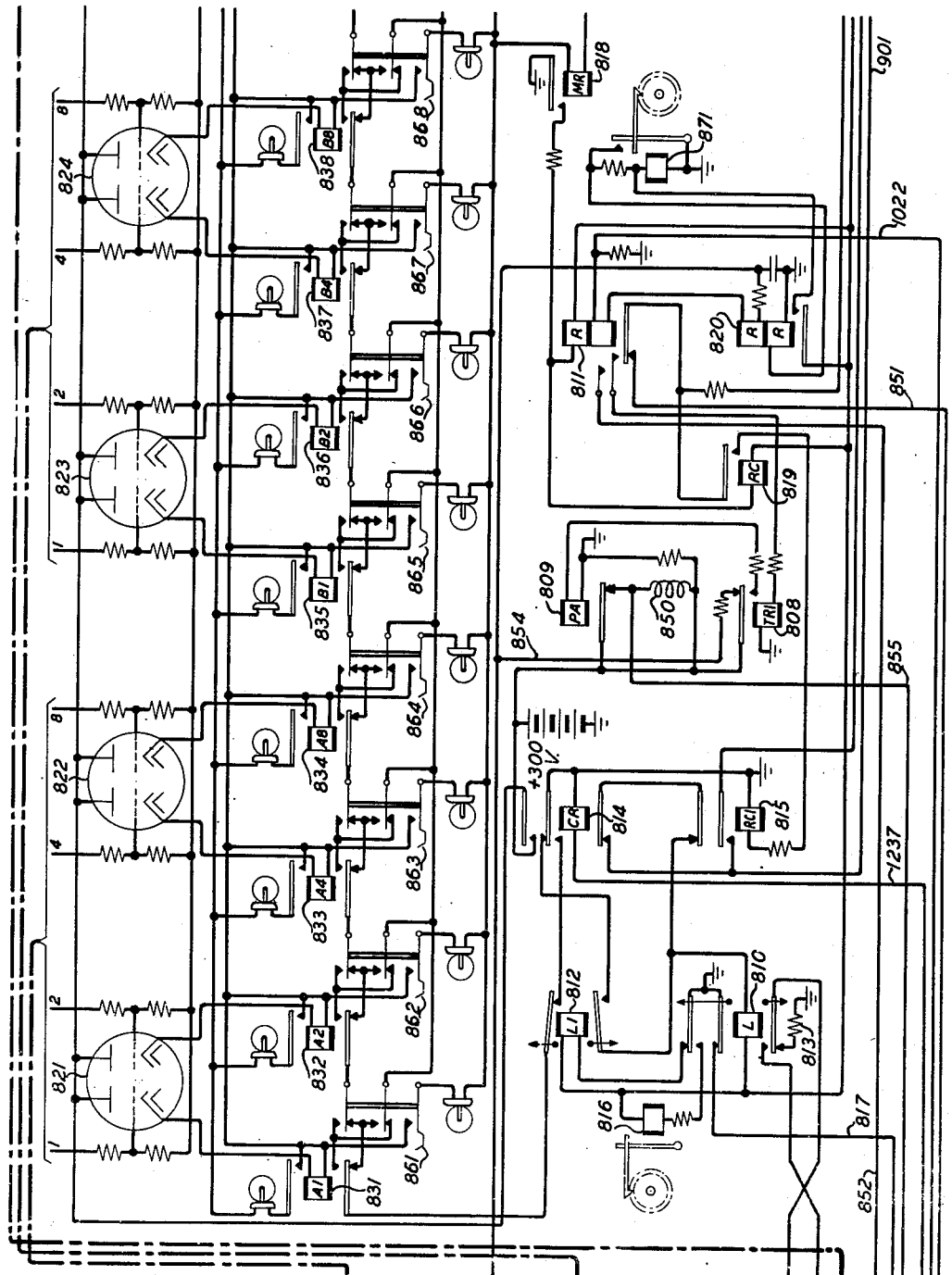
Figure 9:
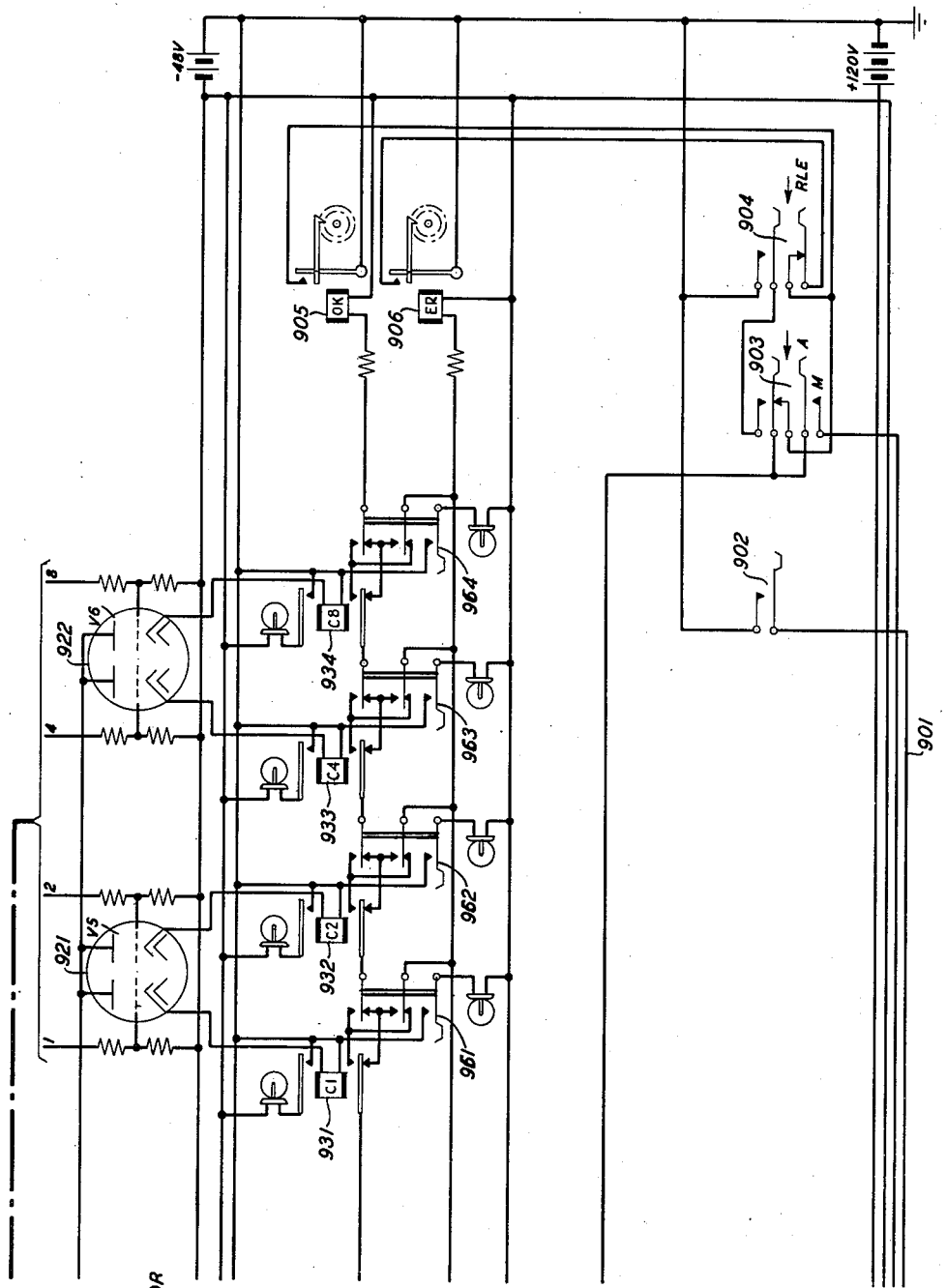

Initiation of a discharge through tube 1211 at this time causes the voltage of the cathode of its tube to rise to a relatively high positive value and apply a sufficiently high positive voltage through condenser 1231 to the cathode of tube 1215 to extinguish a discharge through this tube. In addition, the positive voltage from the cathode of tube 1211 is applied to the control element of the left-hand section of tube 1221. Tube 1221 operates as a cathode follower tube and applies a positive voltage to its cathode circuit in response to the above-described positive voltage applied to its control element or grid. The cathode of tube 1221 is connected to one of the control elements of each of the gas discharge tubes 711, 712, 714 and 717. These tubes are multielement gas discharge tubes and are normally biased so that discharges cannot be initiated through them unless and until the control elements described above have a more positive voltage applied to them. At this time therefore the first row of tubes of Fig. 7 is conditioned to respond to voltages applied to their lower control elements as shown in the drawing whereas all of the other tubes of Fig. 7 are not so conditioned.

At the end of the interval determined by the condenser 1121 and the other circuit constants associated with tube 1110 the left-hand section of this tube starts to conduct current again and interrupts the current flowing through the right-hand section of this tube. This time interval has been selected to substantially coincide with or exceed the maximum length of a received pulse or in the present case from 3½ to 4 milliseconds. Thus, in the specific embodiment described herein this interval of time is substantially the same as that for the circuit including tube 321 but this period may be longer or shorter than the period of the circuits of tube 321. At the end of this interval when the left-hand section of tube 1110 starts to conduct current the receiving equipment is thus again activated to again receive the next start pulse. This next start pulse causes a discharge to be initiated in tubes 320 and 420. The discharge in tube 420 merely discharges condenser 425 which produces no other effects at this time. The discharge through tube 320 applies a positive pulse to the control element of the left-hand section of tube 322 which section repeats this pulse as a negative pulse to the control elements of both sections of tube 323. The discharge through the left-hand section of tube 323 is interrupted by this negative pulse and as a result current again starts to flow through the left-hand section of tube 323. The interruption of current through the left-hand section of tube 323 applies a positive voltage to conductor 332 extending to the control element of the left-hand section of tube 1110 through the coupling condenser 1109. However, inasmuch as the left-hand section of tube 1110 is already conducting current, this pulse produces no effect.

Returning now to the initiation of the flow of current through the left-hand section of tube 1110, the end of the stop pulse of the first digit as described above causes the potential of the anode of this section to fall to a relatively low value and the potential of the anode of the right-hand section to rise to a higher value. The rise in potential of the anode of the right-hand section due to the interruption of current flowing through this section applies a positive pulse through the coupling condenser 1122 to the control grid of the left-hand section of the tube 1114. This pulse, however, is of insufficient magnitude to cause current to start to flow through the left-hand section of tube 1114 at this time. The rise in potential of the anode of the right-hand section of tube 1110 also applies a positive voltage or pulse through the coupling condenser 1205 to the left-hand section of tube 1220. Tube 1220 repeats this voltage or pulse as a negative pulse in its output or anode circuit. However, this negative pulse as applied to the control elements of the gas discharge tubes 1211, 1212, 1213 and 1214 is unable to interrupt the discharge or otherwise affect the conditions of these tubes.

When the voltage of the anode of the left-hand section of tube 1110 falls to a relatively low value in response to the initiation of a discharge through this left-hand section at the end of integration, the voltage applied to the control element of the left-hand section of tube 1113 likewise decreases and falls to a relatively low value with the result that the anode of this section similarly falls to a low value and as a result the anodes of both sections of tube 1020 are restored to their initial low value causing the current through both sections of this tube to increase. As a result the voltage of the anodes falls to a low value and causes the cathodes of tube 1021 to likewise return to a greater negative value. As a result the reference amplifier comprising tubes 1020 and 1021 is rendered unresponsive to further signals or voltages induced in the reference pick-up coil 520. Likewise the rectifier tubes 611 through 620 inclusive, are again biased sufficiently below the cut-off voltage of these tubes so that they will be unresponsive to voltages induced in the pick-up coils 521 to 530 inclusive. As a result the stop pulse of the first digit will produce no further effects upon the rectifiers and the start pulse of the succeeding digit produces no effect upon the circuits connected to the reference pick-up coil at this time. Meantime, of course, the first stop pulse as recorded in the magnetic disc 501 passes adjacent to the permanent magnet conductor 510 which erases the recording of this pulse in the disc 501.

The decrease in voltage of the anode of the left-hand section of tube 1110 at the end of the stop pulse as described above applies a negative pulse or voltage through the coupling condenser 1124 to the control element of the left-hand section of tube 1112. The two sections of tube 1112 are connected in a single-stability circuit in which current flows in one section or the other but may not flow in both sections simultaneously. Current flows through the left-hand section of this tube. However, when flow of current is stopped through the left-hand section current starts to flow through the right-hand section thereof and continues to flow through the right-hand section for a predetermined interval of time depending upon the various circuit constants and at the end of this interval of time current again starts to flow through the left-hand section and restores the circuits of both sections of tube 1112 to their initial condition. It is unnecessary to apply any external voltages or pulses to the circuit at the end of the predetermined interval of time in order to restore the circuit to its initial condition. Thereafter the circuit will remain in its initial condition or position of single stability, until again disturbed by an externally applied voltage. In the exemplary embodiment of this invention set forth herein the time interval during which the right-hand section of tube 1112 is conducting is of the order of .0002 second.

Upon the interruption of current through the left-hand section of tube 1112 at the end of the stop pulse as applied to the reference pick-up coil 520, the voltage of the anode of this section rises to a relatively high positive value and applies a high positive voltage to the control element of tube 1115. Tube 1115 operates as a cathode follower tube and as a result the voltage in the cathode of this tube also rises to a relatively high positive value. As a result a positive pulse of short duration is applied through the coupling condenser 1125 to the control element of the right-hand section of the tube 1114. However, inasmuch as this section is already conducting current the application of a positive pulse produces no change in the current flow conditions in tube 1114.

Figure 10:
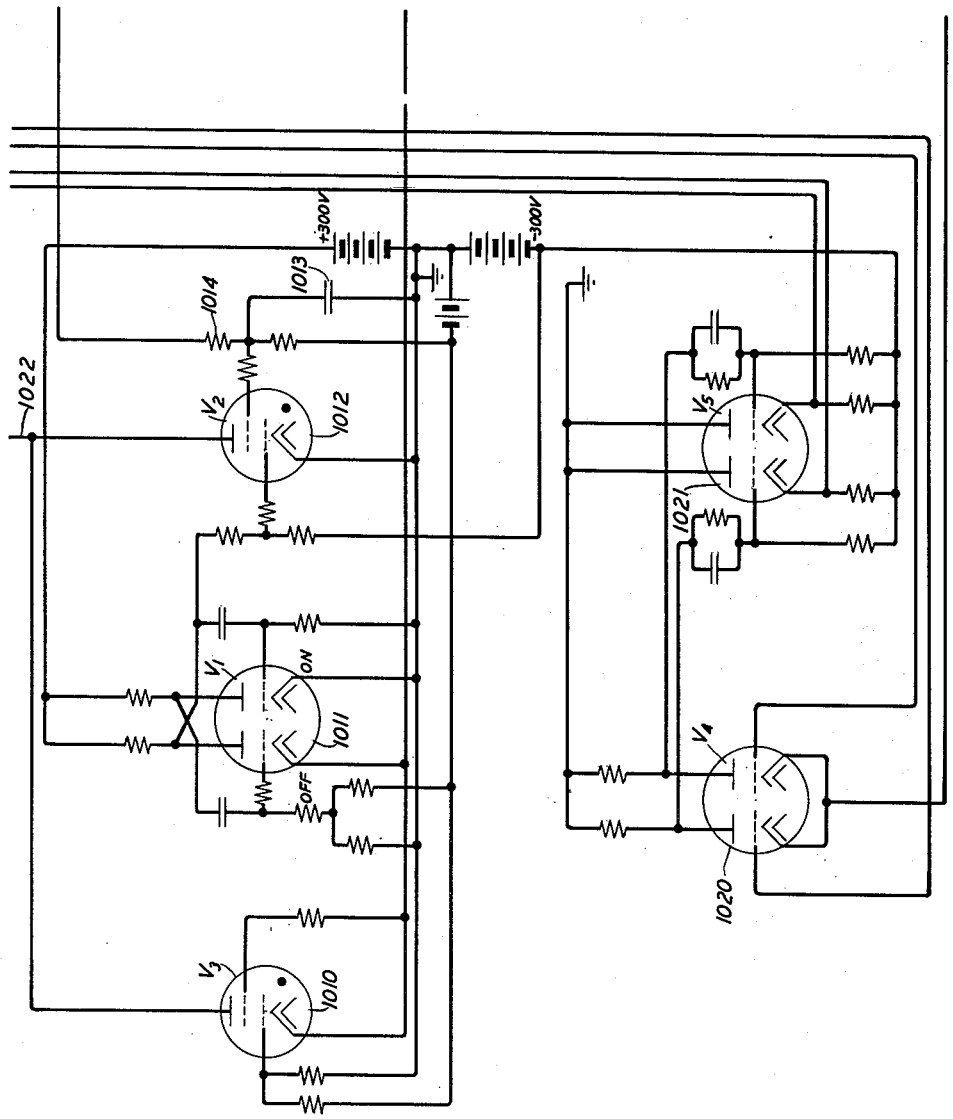
Figure 11:
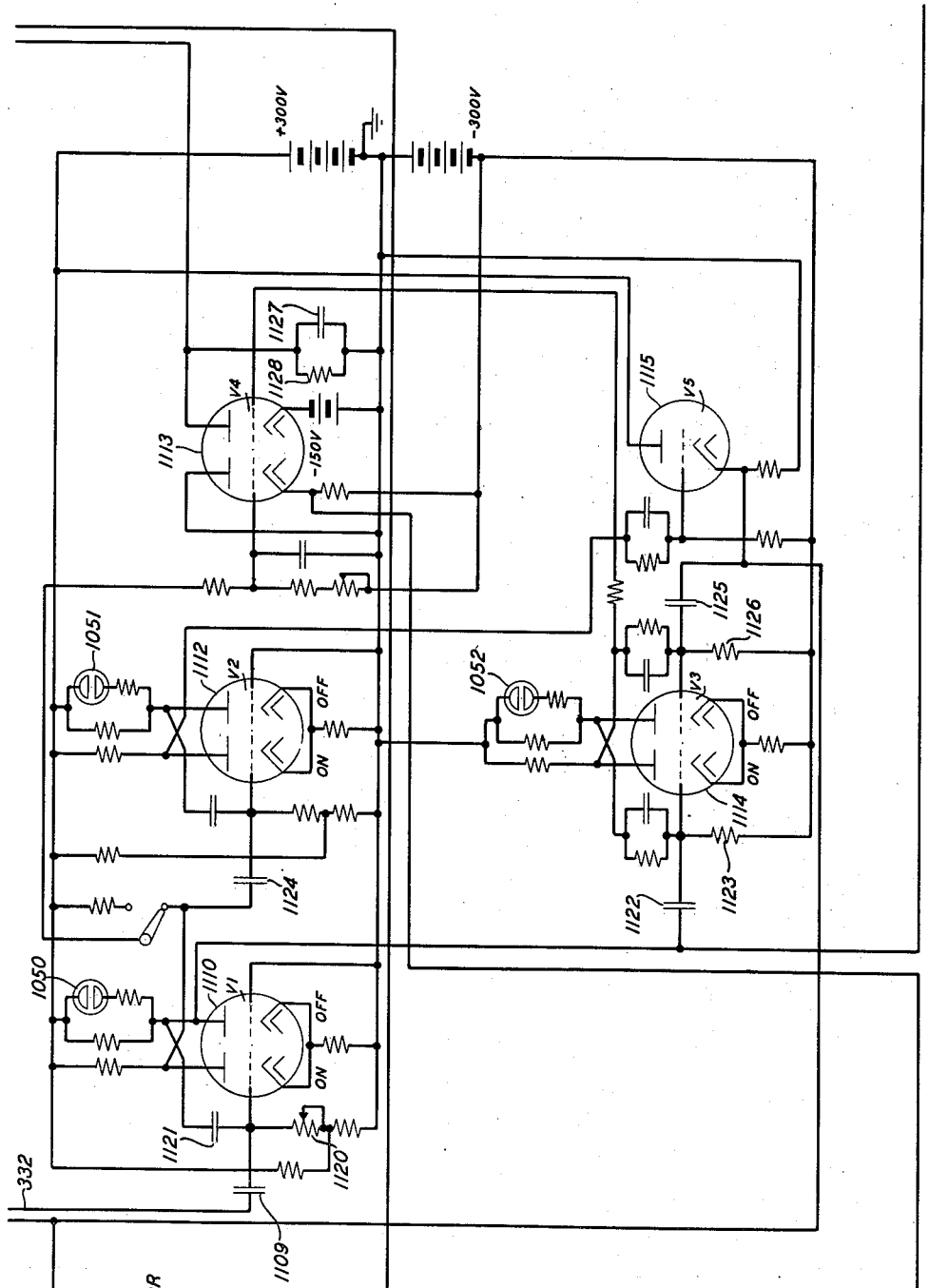

The positive voltage from the cathode of tube 1115 is also applied through the coupling network comprising resistors 1014 and condenser 1013 to one of the control elements of tube 1012. These coupling networks comprise a delay circuit which delays the application of the more positive voltage from the cathode of tube 1115 to the outer control element of tube 1012 as shown in Fig. 10.

The lower terminal of each of the storage condensers 621 through 630 inclusive, is also connected to the cathode of tube 1115. Consequently, when this cathode becomes more positive both the terminals of these condensers also become more positive with the result that the upper terminals have an instantaneous potential which is the sum of the voltage across the respective condensers 621 through 630 and the voltage of the cathode of tube 1115. The upper terminals of these condensers 621 through 630 inclusive, are connected to the lower control elements of the respective tubes 651 through 660 inclusive. These tubes are provided with bias voltages to the upper control elements thereof as well as the voltages applied to the cathodes and anodes of these tubes such that the voltage of the lower control element must rise to a predetermined fixed voltage before a discharge is initiated through any of these tubes. The voltage of the cathode of tube 1115 when it becomes more positive as described above, is sufficiently positive to cause a discharge to be initiated through any of the tubes 651 through 660 when this voltage alone is applied to the respective control elements.

However, as described above, all but one of the storage condensers 621 through 630 inclusive receive a negative charge in response to the application of signal voltages to the control elements of the corresponding rectifiers 611 through 620 inclusive. This negative voltage when combined with the positive voltage of the cathode of tube 1115 is insufficient to initiate a discharge through any of the gas tubes 651 through 660 inclusive. However, as described above, one of the condensers 621 through 630 is not negatively charged during the integrating interval. Consequently only the voltage applied to the control element of the gas discharge tube in series with this condenser from the cathode of tube 1115 will be sufficient to initiate a discharge through this tube.

The tubes 651 through 660 inclusive are gaseous conduction tubes provided with a plurality of control electrodes such that so long as no discharges flow through the tubes the voltages applied to the control elements in the tubes may prevent the initiation of a discharge through the tube. However, upon the initiation of a discharge through any such tube reasonable values of voltage applied to these elements are relatively ineffective and unable to stop the discharge current flowing through the tubes.

Each of the discharge tubes 651 through 660 is provided with an inductance such as 671 and a condenser 681 connected to their respective anodes to cause a discharge through the respective tubes to be interrupted at a predetermined interval of time after the discharge has been initiated. The action of such circuit elements in causing the discharges in gas tubes to be interrupted is well understood so that a detailed description of the operation and theory relating to the extinguishing of the discharges need not be repeated here. The inductance coils 671 through 680 are connected through the common resistor 605 to ground. As a result, current flowing through these coils must flow through the resistor 605 to produce a voltage drop across this resistor. The voltage drop across the resistor 605 is applied to the cathode of the left-hand section of tube 1011 and to the cathode of tube 1010. The voltage drop across resistor 605 employed in controlling the circuits of tubes 1010 and 1011 is of a negative polarity. If one and only one including none of the gas discharge tubes 651 through 660 inclusive, has a discharge initiated through it, the voltage drop across the resistor 605 is insufficient to initiate a discharge through the gas conduction tube 1010 due to the bias voltages applied to the various control elements thereof.

The two sections of tube 1011 are connected to a circuit such that current can flow through only one of these sections at a time. Furthermore, the bias voltages applied to the various elements of tube 1011 are such that the left-hand section is normally maintained non-conductive. However, upon the application of a voltage to the cathode of the left-hand section of this tube in response to the discharge through one of the tubes 651 through 660 a flow of current is initiated through the left-hand section of tube 1011. Due to the interconnections between the sections of tube 1011 the current normally flowing through the right-hand section is interrupted at this time.

The initiation of a discharge through the left-hand section of tube 1011 reduces the anode voltage of this section which reduced voltage is applied to the lower control element of tube 1012. This reduced voltage effectively prevents any discharges being initiated through tube 1012 at this time. Consequently after the delay interval of the delay network comprising resistors 1014 and condenser 1013, the application of the positive voltage to the outer control element of tube 1012, from the cathode of tube 1115, as described above, is insufficient to initiate a discharge through tube 1012 at this time.

If, however, in response to the positive voltage derived from the cathode of tube 1115 as described above more than one of the gas conduction tubes 651 through 660 has a discharge initiated through it, a greater voltage drop is developed across resistor 605 due to the greater current flowing through this resistor. As a result a discharge is initiated through tube 1010 by this greater voltage, in addition to the discharge initiated through the lefthand section of tube 1011. If on the other hand a discharge is not initiated through any of the tubes 651 through 660 in response to the high positive voltage from the cathode of tube 1115, then after the delay interval of the delay network comprising resistors 1014 and condenser 1013, a discharge will be initiated through tube 1012.

In other words if one and only one of the tubes 651 through 660 has a discharge initiated through it in response to the positive voltage from the cathode of tube 1115 a discharge is not initiated through either of the gas conduction tubes 1010, 1012. If on the other hand a discharge is not initiated through any of the tubes 651 through 660 in response to the positive voltage from the cathode of tube 1115 a discharge is initiated through tube 1012. Also, in case a discharge is initiated through more than one of the tubes 651 through 660 inclusive, a discharge will be initiated through tube 1010. The initiation of a discharge through either of the gas conduction tubes 1010 or 1012 completes a circuit through the winding of relay 811 (over conductor 1022) for the operation of this relay which relay in operating recycles and reconditions the entire system as will be described hereinafter. In other words if a discharge is initiated through one and only one of the tubes 651 through 660 the circuit has probably functioned in a normal manner so that the operation of the circuit continues as will be described hereinafter. If on the other hand the circuit has not functioned properly either tube 1010 or 1012 has a discharge current initiated through it which current causes alarm circuits to function to indicate a trouble condition which may then be corrected by the maintenance force.

Assuming for the moment that the system has operated properly and a discharge is not initiated through either tube 1010 or 1012 at the termination of the interval of time determined by the circuit constants associated with the tube 1112, the discharge current through the left-hand section of tube 1112 again starts to flow and reduces the anode potential of this tube. Consequently, the voltage applied to the grid of tube 1115 and thus to the cathode of this tube, then falls to a much lower value which restores the voltages applied to the lower control elements of tubes 651 through 660 to their initial value. Consequently no further discharge may be initiated through the tubes 651 through 660 at this time. The application of a negative voltage to the delay network comprising resistor 1014 and condenser 1013 produces no useful result at this time.

When the voltage of the cathode of tube 1115 falls from a relatively high positive voltage to a much lower voltage as described above, a negative pulse of short duration is applied through the coupling condenser 1125 to the control element of the right-hand section of tube 1114. This pulse is of short duration due to the fact that the grid resistor 1126 together with the coupling condenser 1125 has a short time constant. That is, their product of resistance and capacity is low.

The application of a negative pulse to the control element of the right-hand section of tube 1114 at this time interrupts the current flowing through this section and causes current to flow in the left-hand section thereof thus restoring the circuits of tube 1114 to their initial condition.

Upon the initiation of current flow through the left-hand section of tube 1114 the voltage of the anode of this section falls to a relatively low value. As a result the control element of the right-hand section of tube 1113 likewise falls to a negative potential thus interrupting the current flowing through the right-hand section of this tube. As a consequence the voltage of the anode of this tube starts to rise to approximately ground potential. The rise in voltage, however, is retarded by the delay network comprising resistor 1128 and condenser 1127. This delay is introduced to prevent the false operation of any of the tubes 651 through 660 due to a possible over-charging transient during or at the end of the discharge of condensers 621 through 630. When the anode of the right-hand section of tube 1113 rises to approximately ground potential, the control elements of the tubes 631 through 640 inclusive also rise to approximately this same potential and discharge the negative charges of such of the storage condensers 621 through 630 as are charged, thus restoring these condensers to their initial condition when they are again ready to be employed in the manner described above in response to the reception of the stop pulse of the second digit.

The resistors 681 through 690 connected to the upper terminals of the respective condensers 621 through 630 have a high resistance. In one case the value of these resistors was of the order of ten megohms. These resistors are connected between the upper terminals of the respective condensers and a voltage of about negative ten volts and serve to neutralize any leakage effects between the positive source of voltage, the upper terminals of condensers 621 through 630 and the wiring connected thereto as well as leakage or residual current through the respective tubes 631 through 640.

When one of the tubes 651 through 660 has a discharge initiated through it as described above, and when the first row of translator and register tubes of Fig. 7 is conditioned to be made conductive as described above by the positive voltage applied to the second or upper control element of these tubes due to the voltage applied thereto through the cathode circuit of the left-hand section of tube 1221 which voltage in turn is controlled from the cathode circuit of tube 1211 described above, discharges will be initiated to one or more of the tubes 711 to 718, inclusive. Assume now that one and only one of the tubes, 657 for example, has discharge initiated through it in response to a first digit of 7. Once a discharge is initiated through tube 657, current flows through its cathode resistor raising the potential of the cathode and applying a positive voltage through the resistor network 707 comprising resistors 751 through 767 inclusive to the lower control elements of tubes 711, 712, and 714, thus initiating a discharge to these tubes. Tubes 711, 712 and 714, when a discharge flows through them, in turn apply positive voltages from their cathodes to the control elements of both sections of tube 821 and the control element of the left-hand section of tube 822. Anode battery is not applied to the anodes of these tubes at this time so they do not function at this time.

The resistors 751 through 767 of the resistor network 707 shown in the drawing are provided to permit the cathodes of the tubes 651 through 660 to be connected to the desired grids of the tubes shown in Fig. 7 in the manner shown at the same time preventing improper operation of the other tubes to cause the translation of the dialed code or digit from a decimal basis to a binary number representation.

In other words, while ten tubes 651, 657 and 660, including intermediate tubes not shown in the drawing, are required to indicate each one of ten different digital values as are described above, only four tubes 711, 712, 714 and 718 are required to record the same information in Fig. 7. Thus when a discharge initiated through tube 651 identifies the digit value of one, a discharge is also initiated through tube 711. When discharge is initiated through the next tube assumed to be 652, but not shown in Fig. 6, discharge will be initiated through tube 712. When a discharge representing a digit three is initiated through tube, say 653, not shown in the drawing, then a discharge will be initiated through both tubes 711 and 712 representing three. For a digit four a discharge is initiated through tube 714, for five through tubes 711 and 714, for six through tubes 712 and 714, for seven through tubes 711, 712 and 714, for eight through tube 718, for nine through tubes 711 and 718 and for ten i. e. numeral zero, a discharge is initiated through tubes 712 and 718.

The above-described discharges through tubes 711, 712, 714 and 718 are initiated during the time discharges flow through the anode-cathode circuits of the respective tubes 651 through 660, inclusive. As described above, the discharges through tubes 651 through 660, inclusive, are arranged to be automatically terminated after a predetermined interval of time due to the action of an inductance and the condenser elements connected in the anode circuits of these tubes as previously described. However, when a discharge is initiated through any one or more of tubes 711, 712, 714 and 718, such discharge or discharges are not interrupted at the time of restoration of tubes 651 to 660, but will continue until interrupted as described hereinafter. Coincident with the initiation of the discharges through the various tubes 711, 712, 714 and 718 as described above, similar potentials are applied to the inner control grids of the other translator and register tubes of the second and third rows of Fig. 7. However, the second or upper control elements of these tubes are not sufficiently positive at this time to permit discharges to be initiated through these other tubes in response to the voltages applied to their upper control elements.

In addition, it should be noted that the magnitude of the various translating resistors such as 707, together with the magnitude of the resistors connected in the cathode circuits of the tubes 651 through 660, inclusive, are such that insufficient potential is applied to the inner control elements of the other tubes of Fig. 7 through two or more resistors such as resistor 707, when a path traced from a discharging tube 651 through 660 to the inner control elements of any one of the tubes 711, 712, 714 through 718 passes through two or more such resistors.

It is thus apparent that the numerical value of the first digit has been determined in accordance with the time of arrival of the second or stop pulse representing this digit and the value transferred to the tubes shown in Fig. 7. In addition, the circuits of the receiving and storing devices set forth herein have been reset so that they are in condition for receiving the start pulse of the next digit. This pulse when it arrives is repeated through the system in the manner described above causing discharges through tubes 320 and 420. Discharges through tube 420 result in keeping condenser 425 discharged, but otherwise perform no useful function. A positive pulse from the cathode of tube 320 is repeated as a negative pulse in the output circuit of the left-hand section of tube 322 in response to this start pulse. This negative pulse in turn causes the discharge flowing through the left-hand section of tube 323 to be interrupted and a discharge initiated through the right-hand section of this tube as a result.

Interruption of the discharge flowing through the left-hand section of tube 323 at this time applies positive voltage to the control element of the left-hand section of tube 1110; inasmuch as this circuit is already conducting current this positive voltage produces no further effect. This second start pulse is of course recorded by the magnetic recording and delay device shown in Fig. 5 and later passes between the pole-pieces of the various pick-up coils in the same manner as described above. Upon the reception of the second stop pulse the circuits operate as described above in response to the first stop pulse except that in response to the second stop pulse a discharge is initiated through tube 1212 instead of 1211 and the discharge flowing through tube 1211 is interrupted; consequently, the potential of the second or upper control elements of tubes 711, 712, 714 and 718 is restored to lower or negative value so that further discharges will not be initiated through any of these tubes. The discharges already flowing through the various tubes, however, continue to flow at this time. In addition, the voltage applied to the second or upper control elements in the second row of tubes, namely, tubes 721, 722, 724 and 728 is raised to a sufficiently high value so that upon the application of a more positive voltage to the lower control elements of these tubes, discharges will be initiated through these tubes between their anodes and cathodes in the same manner described above with reference to tubes 711, 712, 714 and 718.

Thereafter, the circuit is operated in the same manner as described above in response to the second stop pulse. The third start and stop pulses cause the circuits to be operated in a similar manner so that the numerical value of the symbol or digit represented by this third group of pulses is stored by the third row of tubes shown in Fig. 7.

If it is desired to record additional digits, additional tubes similar to tubes 1211, 1212, 1221 and 1222 will be provided; in addition similar storing tubes similar to tubes 711, 712, 714 and 718 will be provided together with tubes similar to 821, 822 with corresponding relays similar to 831, 832, 833 and 834, to register or store the magnitude of each of the desired or necessary number of digits. In the exemplary embodiment described, it has been assumed that it is desired to store the numerical values of only three digits. Consequently, only three groups of the various types of circuits and apparatus has been shown in the drawing. Any number, however, may be employed as may be necessary or desired.

In the arrangement shown in the drawing, the circuits operate in the same manner as described above in response to the fourth start pulse. However, in response to the fourth stop pulse a discharge is initiated through tube 1214 which interrupts the discharge flowing through tube 1213 due to the action of condenser 1234 in the manner described above. Discharge current flowing through the cathode resistor of tube 1214 applies a more positive voltage to the control element of the right-hand section of tube 1220. Tube 1220 operates as a cathode follower tube and repeats a positive voltage in its output or cathode circuit. This positive voltage causes the operation of relay 814 (over conductor 1237) and also is repeated by the right-hand section of tube 322 as a negative voltage. The anode of the right-hand section of tube 322 is coupled to the control grid of the left-hand section of tube 321. The low positive voltage from the right-hand section of tube 322 maintains the voltage of the anode of the right-hand section of 321 at a low value; consequently, the circuits of tube 321 remain in the condition wherein the anode of the left-hand section of tube 321 is at a relatively low positive voltage which voltage is applied to the inner control element of tube 320 and effectively prevents any further discharges through this tube in response to the reception of further repetitions of pulses of the complete subscriber's designation. Consequently, the circuits do not respond to any further repetition of the received pulses representing the designation.

The operation of relay 814 interrupts the operating and locking circuit of relay 810 which relay is slow to release and starts to release at this time. The operation of relay 814 in addition applies positive battery to the anodes of tubes 821, 822, 823, 824, 921 and 922, thus conditioning the tubes to repeat the potential conditions on the cathodes of the tubes of Fig. 7 to the corresponding relays 831 to 838 and 931 to 934 of Figs. 8 and 9, operating the relays in accordance with the numerical values of the digits of the recorded subscriber's designation as recorded by the tubes of Fig. 7.

The various relays 831 to 838 and 931 to 934, inclusive, may be employed to control switching circuits for the selection of subscribers' lines, circuits, or other suitable transmission paths, as described in the above-identified application of Malthaner, Serial No. 35,925, filed June 29, 1948, or in any other suitable manner. As shown in the drawing keys 851 through 858 and 951 through 954 have been associated with each of the respective relays 831 through 838 and 931 through 934 for checking purposes. When it is desired to test the operation of a system, a predetermined subscriber's designation is repeatedly transmitted to the system shown in the drawing. This designation is set upon the keys 851 through 858 and 951 through 954 associated with the registering relays described above. These keys and relay contacts are wired in a circuit such that if the relays operate in accordance with the position of the keys, a circuit will be completed upon the release of relay 810 and the operation of relay 812 through the circuit of an O. K. message register 905. Upon the other hand, if any one or more of the relays is not in the same position as the associated key, the time relay 810 releases and relay 812 operates, the error message register 906 operates. Relay 810 is made slow in releasing so that various register relays 831 to 838, 931 to 934, have ample time to become fully operated in accordance with the received pulses prior to completion of the circuit from ground through the upper interrupted contacts of relay 814 and the operated contacts of relay 812 to battery through the windings of either the O. K. or error message registers through the contacts of the recording relays and the associated keys.

With keys 904 and 903 set as shown in drawing for continuous automatic operation, the operation of either the error register 906 or the O. K. register 905 completes a circuit from ground through the operated contacts of one or the other of these registers, contacts of keys 904 and 903 to battery through winding of relay 818. Relay 818 operates and completes obvious circuits for the operation of relays 819 and 811. Relay 819 in turn completes an obvious circuit for the operation of relay 815. Relay 815 in operating opens the operating circuit of relay 810 so that this relay cannot reoperate as long as relay 815 is operated.

The operation of relay 811 removes anode battery from the anode circuit of tubes 1211 through 1215 inclusive (over conductor 851) thus interrupting any discharges which may be flowing through any one of these tubes. Normally, under the assumed conditions the discharge will be flowing through tube 1214 when relay 811 operates. This discharge is then interrupted. The operation of relay 811 also applies positive battery to the control grid of the left-hand section of tube 422 through the uppermost operated contacts of relay 811 (over conductor 852). The application of positive battery to the control grid of the left-hand section of tube 422 causes current to flow in the left-hand section and interruption of the current which may be flowing to the right-hand section of this tube, thus adjusting the circuits in the lower portion of Fig. 4 to their normal idle condition. It is to be understood that, of course, upon the cessation of signals repeated to tube 420 condenser 425 receives a positive charge sufficient to cause the left-hand section of tube 421 to become conducting and thereafter the left-hand sections of tubes 421 and 422 remain conducting until further pulses are received as described above.

The operation of relay 811 also completes a circuit for the operation of relay 808 which relay operates and removes anode battery from the anodes of the tube of the translator and registering circuits of Fig. 7 over conductor 854 thus interrupting all the discharges to the various tubes in this figure. Operation of relay 808 also removes the anode battery from the anodes of the register tubes 651 through 660 inclusive as well as from the anodes of tubes 631 to 640 inclusive (over conductor 854), thus preventing the improper charging of condensers 621 through 630 inclusive and thus restoring the summing or integration circuit of Fig. 6 to its normal idle condition.

Operation of relay 808 also completes an obvious circuit for the operation of relay 809 which relay in turn operates and removes a short circuit from around the inductance 850 and in effect applies a negative pulse to the control grid of the right-hand section of tube 323 (over conductor 855) thus interrupting any discharge through this section of the tube and restoring the tubes of the start circuit as shown in the lower portion of Fig. 3 to the normal or idle condition.

Upon the interruption of the discharge in tube 1214, as described above, positive potential is removed from its cathode and thus from the control grid of the right-hand section of tube 1220. As a result the cathode of this section of tube 1220 returns to substantially ground potential thus permitting relay 814 to release and removing the positive potential from the control element of the right-hand section of tube 322. This in turn restores the potential of the anode of the left-hand section of tube 321 and the control element of the right-hand section of this tube to a more positive voltage whereupon the start circuit is in condition to operate in the manner described above upon the reception of another start signal.

Release of relay 814 removes the anode potential from tubes 821, 822, 823, 824, 921 and 922 thus restoring the relays associated with these tubes 831 to 838 and 931 to 934 inclusive to the idle or normal condition. In addition, release of relay 814 removes the operating ground from either the message register 905 or 906 thus permitting this register to release. The release of the operated register causes relay 813 to release and interrupt the operating circuits of relays 811 and 819 thus permitting them to release. The release of relay 819 releases relay 815. The release of relay 811 restores operating anode potentials to the gas tubes 1211 to 1215 inclusive in the steering circuit shown in Fig. 12. The release of relay 811 also removes positive voltage from the control grid of the left-hand section of tube 422. However, due to the double stability circuit arrangement of tube 422 current continues to flow through the left-hand section of this tube.

The release of relay 811 interrupts the operating circuit of relay 808 which relay in turn interrupts the operating circuit of relay 809. The release of these two relays restores the positive anode voltage to the gas tubes of Fig. 7 and Fig. 6. The release of relay 809 short-circuits the inductance 850 again so that it will be ready to restore the circuits of tube 323 to their normal or idle condition at the end of the next series of pulses received by the circuit.

The release of relays 814 and 815 restores the circuit for relay 810 whereupon this relay will reoperate and the circuits respond in the manner described above in response to the succeeding pulses transmitted to the circuit.

Key 904 is operated when it is desired to stop the operation of the circuit in case an improper subscriber's designation has been recorded on the recording relays 831 through 838 and 931 through 934, so that an attendant may have time to examine the circuits and their mode of operation. When key 904 is operated the circuit for the operation of relay 818 is interrupted. Consequently, when an improper designation or number is received with key 904 operated, the operation of the system is interrupted upon the operation of the error register 906 with the received designation standing upon the storing relays. In addition, the lights associated with the keys 851 through 858 and 951 through 954 are lighted if the keys are operated so that the attendant may determine which portion or portions of the subscriber's designation were not properly received. As shown in the drawing a group of lamps are wired so that they indicate or designate numbers recorded or registered by the relays 831 through 838 and 931 through 934 inclusive. When desired, the attendant may, upon observing these numbers, momentarily operate key 904 whereupon the circuit is restored to its normal or idle condition as described above and available for use and responding to succeeding series of pulses representing subscriber's designations.

As described above in case none of the tubes 651 through 660 or more than one of these tubes has a discharge initiated through it in response to a stop pulse, either tube 1010 or 1012 will have a discharge initiated through it and complete a circuit through the lower winding of relay 811 and the upper winding of relay 820 for the operation of these relays. Relay 820 in operating completes an obvious circuit for the operation of the message register 851 for recording the number of recycles. Upon the operation of the message register 851 the locking circuit of relay 820 is interrupted by connecting ground to both of its winding terminals whereupon this relay releases and releases the register 851.

The operation of relay 811 at this time restores the various circuits to their normal or idle condition except that relay 814 has not been operated because the digits required have not been properly received. Consequently, relay 810 remains operated and relay 812 remains released.

Briefly, the operation of relay 811 removes battery from the anodes of the gas tubes in steering circuit shown in Fig. 12. Relay 811 completes an obvious circuit for the operation of relay 808 which relay in turn completes a circuit for the operation of relay 809 and removes battery from the anodes of the tubes of the translating and registering circuit of Fig. 7 and the gas-discharge tubes of the recording circuits shown in Fig. 6 thus causing all of the discharges from the various tubes of these circuits to be extinguished. The operation of relay 809 at this time removes the short-circuit from around inductance 850 which causes the circuits of tube 323 to be restored to their initial condition as described above. In addition, the operation of relay 811 applies positive battery to the control grid of the left-hand section of tube 422 and thus restores the circuits of this tube to their previous condition.

The operation of relay 808 also removes the operating voltage from the anodes of tubes 1010 and 1012 thus permitting whichever one of these tubes has a discharge flowing through it to cease conducting current and interrupting the circuit for the operation of relays 811 and 820 whereupon these relays release and in turn release relay 808 and 815 thus restoring the circuits for operation upon a reception of the next start pulse following the long pause in transmission or blank interval as described above.

The operation of the various tubes and circuits described above is illustrated by the graphs shown in Figs. 13 and 14. For example, the graph designated 1301 in Fig. 13 represents representative signals transmitted from a subscriber's station showing a portion of two series of pulses, each series of which represents a subscriber's number or designation. Each series of pulses is made up of 16 pulses comprising eight start pulses and eight stop pulses. Each series is separated by two blank intervals designated B in the drawing. It is assumed that such a series of pulses is transmitted from the subscriber's station 301 over the subscriber's line 302 and switching equipment 303 to the input of the receiving equipment in accordance with this invention.

While relay 810 may be operated before or after the start of the signals 1301 it is assumed in Fig. 13 that relay 810 is operated some time after the equipment of the subscriber's station 301 starts to transmit signals to the central office. Graph 1302 illustrates the time at which it is assumed that relay 810 operates. Graph 1303 illustrates the time that relay 812 releases and locks relay 810 operated under control of relay 814 as described above.

The operation of relay 810 connects the output of the switching and terminal equipment 303 to the input transformer 310. Graph 1304 illustrates a typical form of signals as received and applied to the transformer 310 in response to the signals 1301 applied to the subscriber's line at the subscriber's station 301. These signals are amplified by the gain controlled amplifier comprising tubes 311 and 312 in the manner described above. The amplified signals are of substantially the same wave form as those shown in graph 1304. It is assumed that graph 1304 therefore illustrates wave form of the signals after they have passed through the amplifier comprising tubes 311 and 312. These signals are applied to one of the control elements of the gas discharge tube 320. Except as described hereinafter bias applied to the control elements of tube 320 is such that a discharge is initiated through tube 320 each time the line signal wave exceeds a predetermined amplitude which is illustrated at 1314 in Fig. 13. The graph 1305 illustrates the wave form current flowing through the discharge tube 320. As shown by the graph 1305 and as described above, due to the action of condenser 327, resistor 328 and the other parameters of the circuit of tube 320, discharges flowing through this tube are self-extinguishing and exist for only a short interval of time. The output pulses from tube 320 are applied to a control element of tube 420 where they cause similar discharges to be initiated through tube 420. Condenser 425 is connected in the output circuit of tube 420 and tends to charge through high resistor 426 to a relatively high voltage between discharges through tube 420. Tube 420 is provided with a self-extinguishing discharge circuit comprising resistors 424, 426, and inductance 423 in addition to the condenser 425. Each time a discharge is initiated through tube 420 the condenser 425 is discharged.

Prior to the application of signals to the circuit the terminal of this condenser is charged to a maximum value and upon the application of the first pulse as illustrated in graphs 1305 and 1306, the upper terminal of this condenser is discharged and after the termination of the discharge the condenser again starts to charge. However, the charging time of the condenser is sufficiently slow so that it has received only a small charge when the next pulse arrives and is again discharged by this pulse.

When condenser 425 is discharged in response to the first pulse applied to the control element of tube 420, it applies a more negative pulse or voltage to the control element of the left-hand section of tube 421 thus interrupting the discharge through this section tube of tube 421 and initiates a discharge through the right-hand section of tube 421 as described above. Interruption of the discharge through the left-hand section of tube 421 causes the voltage of the anode of this section to rise as illustrated by graph 1307. This voltage is coupled through a small coupling condenser 428 to a grid of the left-hand section of tube 422 which causes a positive pulse of short duration to be applied to the control element of the left-hand section of tube 422. This pulse is illustrated in graph 1308. However, inasmuch as the left-hand section of tube 422 is conducting current at this time the short positive pulse applied to this grid produces no useful results at this time.

Thereafter, as described above, upon the reception of each of the remaining pulses of the first series the voltage at the upper terminal of condenser 425 is lowered by the discharge through tube 420 as shown in graph 1306. However, upon the reception of the blank intervals between the two series of pulses, the voltage at upper terminal of condenser 425 rises to above a critical reference value illustrated by line 1313 in Fig. 13. As a result the flow of current through the left-hand section of tube 421 is again initiated causing the voltage of its anode to fall to a relatively low value as shown by graph 1307. At this time a negative pulse of short duration is applied through the small condenser 428 and control element of the left-hand section of tube 422 which pulse interrupts the current flowing through the left-hand section of tube 422 and causes current to flow through the right-hand section of this tube. Upon the reception of the first start pulse of the next series, a discharge will again be initiated through tubes 320 and 420 and again cause condenser 425 to be discharged lowering the voltage of its upper terminal. As a result the current flowing through the left-hand section of tube 421 is interrupted and the voltage of its plate or anode again rises to a more positive value as shown in graph 1307. At this time, a pulse of positive voltage of short duration is again applied to the control element of the left-hand section of tube 422. This pulse is of insufficient magnitude to initiate a discharge through the left-hand section of tube 422. As a result current continues to flow through the right-hand section until the circuit is restored at the end of a series of pulses or in response to a recycling operation as described above.

Thus, it is necessary to receive one pulse or signal before the blank interval and then the blank interval before the current flowing through the left-hand section of tube 422 is interrupted.

When a discharge through the left-hand section of tube 422 is interrupted the voltage of its anode rises as illustrated by the graph 1309 and applies more positive biasing voltage to the grid or control element of the left-hand section of tube 322 thus conditioning this tube to respond to and repeat the pulses from the cathode of tube 320.

The interruption of the discharge through the left-hand section of tube 422 and the initiation of a discharge through the right-hand section of this tube causes the voltage of the cathode of both sections of this tube to fall to a lower positive voltage as described above. This voltage is applied through small coupling condenser over lead 432 to the grid of tube 1222 through suitable coupling circuits and the output of tube 1222 coupled to the control element of the gas discharge tube 1215. Due to the action of the coupling condenser a pulse of negative voltage of short duration is applied to the grid or control element of the right-hand section of tube 1222 which section repeats this voltage as a positive voltage and applies a positive pulse of short duration to the control element of tube 1215 which initiates a discharge through this tube. The discharge flowing through tube 1215 then continues until interrupted as described herein. In addition the initiation of the discharge through tube 1215 interrupts the discharge flowing through tube 1214 if a discharge had been previously flowing through this tube.

At this time, the circuits are conditioned to respond to the second series of pulses shown on Fig. 13 and to record the significant information represented by these pulses in the manner described herein.

In order that the operation of the circuits at this time may be more readily understood the first four pulses representing the first two digits of the subscriber's numer or station designation are shown in Fig. 14 on an amplified scale. Here graph 1401 again represents the signals as transmitted from a subscriber's station. In addition the time interval assigned to each digit has been divided up into 25 increments or unit divisions and the possible positions of the various pulses representing different digit values are shown in dotted lines. The solid line is shown in the zero position so that if it is assumed that the pulse is received at this time, it represents the zero value for the first digit of the subscriber's number. The second stop pulse is shown in the No. 4 position. It is, of course, understood that these stop pulses may be received in any one of the 10 positions in their respective pulse intervals.

Graph 1402 shows corresponding pulses as received from the output of the amplifier tubes 311 and 312. When these pulses exceed a predetermined magnitude such as represented by lines 1403 in Fig. 14, they initiate a discharge through tube 320. Due to the self-extinguishing action of condenser 327 and resistor 328, the discharge current flows through tube 320 for only a short interval of time as illustrated by the pulses 1404 and 1405 and the remaining pulses of the same graph shown in Fig. 14.

Each time one of these pulses is received the voltage of the plate of tube 320 is reduced and applies a negative pulse through the coupling condenser to the grid of the left-hand section of tube 321, thus interrupting a discharge flowing through the left-hand section of this tube and initiating a discharge through the right-hand section. As described above this discharge continues to flow for an interval of time substantially the same as the time required for the incoming pulse, and the transient accompanying it, to die out. At the end of this time the current starts to flow through the left-hand section of tube 321 and the current flowing through the right-hand section of this tube is interrupted. During the time current is flowing through the righthand section of tube 321 the potential applied to the inner control element of tube 320 as shown in Fig. 3 is reduced so that it is impossible to initiate further discharges through tube 320 in response to noise currents or to any of the transients or oscillations forming a part of the received pulse. At the end of this transient interval, tube 320 is conditioned to respond to a succeeding pulse. Graph 1406 of Fig. 14 shows the voltage of the plate or anode of the right-hand section of tube 321. As shown in this graph this voltage and thus the voltage of the inner control element of tube 320 is reduced to a low value after each discharge through tube 320 and maintained at this low value for a time interval substantially equal to the time required for the received pulse to die out. The above-described action of tubes 320 and 321 takes place upon the operation of relay 810 as described above and continues so long as pulses are received by the equipment described herein, both during the operation of the circuits as described above with reference to Fig. 13, and during the operation of the circuits described herein with reference to Fig. 14.

Upon the reception of the first start pulse after the blank interval a discharge is initiated through tube 320 as described above and illustrated by pulse 1404. This pulse is repeated through the left-hand section of tube 322 and applied to the grids of both sections of tubes 323 where it interrupts current flowing through the left-hand section of tube 323 and initiates the flow of current through the right-hand section of this tube. Thereafter current continues to flow through the right-hand section of this tube until the stop pulse is received as illustrated by pulse 1411 which causes a second discharge 1405 to flow through tube 320. This discharge again causes a pulse to be repeated by tube 322 which pulse interrupts current flowing through the right-hand section of tube 323 and initiates the current flowing through the right-hand section of this tube. Thereafter tubes 320, 322 and 323 respond in the same manner to each pair of pulses.

The voltage of the plate of the left-hand section of tube 322 is illustrated by graph 1407, the voltage being of a low value when the left-hand section is conducting current and of a relatively high value when the left-hand section is not conducting current.

Upon the interruption of current through the left-hand section of tube 323, a positive voltage of short duration is applied over conductor 332 and through the small condenser 1109 to the control element of the left-hand section of tube 1110. Inasmuch as this section of tube 1110 is already conducting current, this pulse produces no useful effect upon the circuits. The graph of the voltage applied to the control grid of the left-hand section of tube 1110 from tube 323 through condenser 1109 is illustrated by graph 1408.

Upon the reception of the stop pulse the flow of current is initiated through the left-hand section of tube 323 which in turn causes negative pulse 1424 to be applied to the control element of the left-hand section of tube 1110 which pulse interrupts the current flowing through this section and initiates a flow of current through the right-hand section of tube 1110. As described above, the current thereafter continues to flow through the right-hand section of tube 1110 for a time interval which is substantially equal to the time interval required for the received pulse to die out. In other words, the right-hand section of tube 1110 remains conducting for about the same time interval that the right-hand section of tube 321 remains conducting. Thereafter, the flow of current through the left-hand section is again initiated and the current flowing through the right-hand section interrupted automatically without the application of any signaling or control pulses through any of the circuits of this tube. In response to the next start pulse another positive voltage pulse is applied to the control element of the left-hand section of this tube, but inasmuch as this section is already conducting current this pulse again produces no useful results. The succeeding stop pulse then interrupts the current flowing through the left-hand section of tube 1110 for the same predetermined time interval. Thereafter each succeeding pair of pulses which it is desired to record cause the circuits of tubes 320, 322, 323 and 1110 to operate in the manner described.

Graph 1409 shows the voltage of the plate of the left-hand section of tube 1110. This voltage is of a relatively low value while this section is conducting and of a relatively high value when it is non-conducting.

During the time the left-hand section of tube 1110 is non-conducting and its voltage has a relatively high value, a more positive voltage is applied to the cathodes in both sections of tube 1020 which causes this tube and tube 1021 to operate as amplifier tubes and repeat the output from the reference pick-up coil 520 and also to condition the rectifier or integrating tubes 611, 617, 620, etc. to properly respond to the signal voltages induced in the windings and circuits of the channel pick-up coils 521 through 530 in the manner described above.

The delay interval and spacing of the reference pick-up coil 520 is such that the entire stop pulse as received passes under the pick-up coil 520 during the time the left-hand section of tube 1110 is non-conducting as shown by graph 1410. Thus, during this time the amplifier tubes 1020 and 1021 and the rectifier tubes 611, 617, 620, etc. are conditioned to respond to the voltages introduced in the pick-up coils as described above, the voltage from the pick-up coil 520 as amplified by tubes 1020 and 1021 is applied to all of the other pick-up coils 521 through 530 and through these coils to the respective rectifier tubes 611 through 620. These voltages are all rectified by the rectifier tubes and cause a potential to appear across the corresponding storage or integrating condensers 621 through 630 in the manner described above. However, in the case of one pick-up coil the voltage from the amplifier tube 521 will substantially neutralize the voltage induced in this coil due to the fact that the start pulse is passing under this pick-up coil during this interval of time. As a result one of the condensers 621 through 630 will not have a charge stored upon it of the same magnitude as is stored upon the other condensers. Consequently, one of the associated gas tubes 651 through 660 will have a discharge initiated through them in response to the operation of the circuits of tube 1112. This operation is illustrated by graph 1415 and pulses 1412 and 1414. When the flow of current through the left-hand section of tube 1110 is interrupted a positive pulse of short duration is applied through the coupling condenser 1124 to the control element of the left-hand section of tube 1112. Inasmuch as the left-hand section of this tube is already conducting current at this time the pulse 1412 produces substantially no effect upon the tube. However, at the termination of the integrating interval when current again starts to flow through the left-hand section of tube 1110 a negative pulse illustrated by pulses 1414 is applied to the control element of the left-hand section of tube 1112 which causes current flowing through this section to be interrupted and current to flow through the right-hand section of this tube. As described above, the sections of tube 1112 are arranged so that current will continue to flow through the right-hand section of tube 1112 for a short interval of time and thereafter current will start to flow through the left-hand section and interrupt current flowing through the right-hand section independently of the application of any other signal or control voltages to this tube.

During the time the current is interrupted through the left-hand section of tube 1112 the voltage of its anode rises as shown by pulse 1415. This voltage is repeated by tube 1115 and applied to the lower terminals of condensers 621, 627, 630, etc. and raises the potentials of both the terminals of these condensers. The charges stored upon the condenser are opposed to this voltage so that the combined voltage from the cathode of tube 1115 plus the voltage stored upon the condenser 621 through 630 is insufficient to initiate a discharge through any of the tubes 651 through 660, except the one tube associated with the condenser which has a smaller charge stored upon it designating the value of the particular digit.

Thus a discharge initiated through only one of the tubes 651 through 660 which tube indicates the identity or value of the digit represented by the two pulses.

The voltage wave form of the plate of the right-hand section of tube 1110 is opposite to the voltage wave form of the plate of the left-hand section of this tube as illustrated by graph 1316. This voltage is applied to the control element of the left-hand section of tube 1114 through the small condenser 1122 with the result that pulses 1417 and 1418 are applied to this control element. The negative pulse 1417 interrupts current flowing through the left-hand section of this tube and causes the voltage of the plate of this section to rise as shown by graph 1421. The positive pulse 1418 however, is insufficient to initiate a discharge through the left-hand section of tube 1114. Consequently, the current continues to flow through the left-hand section until a negative pulse is applied to this section through the coupling condenser 1125 from the output of tube 1115. The pulses applied to the control element of the right-hand section of tube 1114 are illustrated by pulses 1419 and 1420 of Fig. 14. When the negative pulse 1420 is applied to the control element the right-hand section of this tube current flowing through the right-hand section is interrupted and current through the left-hand section initiated, restoring the tube to its original condition and illustrated in graph 1421.

During the time current is flowing through the left-hand section of tube 1114, a reset voltage is applied to the control voltage of tubes 631 through 640 which voltage causes these tubes to discharge the upper terminals of condensers 621 through 630. However, when current flowing through the left-hand section of tube 1114 is interrupted the tubes 630 through 640 are substantially cut off so that during the integrating interval and the subsequent pulse interval 1415, tubes 631 through 640 do not effect the voltage applied to the upper terminals of these condensers and thus do not interfere with the integrating action of the recording of the digit. However, after the value of the digit is recorded the voltage of the plate of the left-hand section of tube 1114 again falls so that tubes 630 through 640 restore the charge upon the condenser 620 through 630 to their initial condition where they will be ready to respond to the next integrating interval in the manner described above.

The anode voltage from the right-hand section of tube 1110 is also applied to the grid of the left-hand section of tube 1220 through the coupling condenser 1205. As a result the left-hand section of tube 1220 repeats a pulse of positive voltage of short duration in response to each of the interruptions occurring through the left-hand section of tube 1110. For example, in response to the reception of the first stop pulse, current flow through the right-hand section of tube 1110 is initiated and as a result a negative pulse similar to pulse 1417 is applied to the control element of the left-hand section of tube 1220. This pulse is repeated as a positive pulse to the control grids of tubes 1211 through 1214 and causes a discharge to be initiated through tube 1211 due to the increased bias applied to this control grid from the cathode of tube 1215.

Tube 1211 in having a discharge initiated through it interrupts the discharge through tube 1215 and conditions the left-hand section of tube 1221 to repeat a positive voltage from the cathode of tube 1211 which voltage is applied to the control elements of the first row of storing tubes 711 through 718 so that upon the initiation of the discharge through one of the tubes 651 through 660 a discharge will also be initiated through the tubes 711 to 718 in accordance with the translating network of resistors 707 in the manner described above.

Each succeeding pair of start and stop pulses causes the circuits to operate in substantially the same manner except that the next time a discharge is initiated through the right-hand section of tube 1110 a discharge is initiated through tube 1212 and the discharge through tube 1211 interrupted. Consequently, when a discharge is initiated through one of the tubes 651 through 660 discharges will also be initiated through tubes 721 through 728 in accordance with the translating network of resistors 707. Thus each succeeding pair of pulses causes discharges through succeeding groups of storage tubes. After such groups of start and stop pulses have been received as required to be recorded the circuits operate as described above and cause the value of the digits to be recorded upon the relays 831 through 838 and 931 through 934. The values of these digits are then applied to operate lights, lamps, message registers, control switching circuits or they may be employed in any other desired manner. As described herein the circuits are then reconditioned to respond to other calls. If the circuits in responding to any pair of pulses fail to cause a discharge through one of the tubes 651 through 660 or cause discharges through two or more of these tubes, the circuits are recycled in which case the values of none of the digits represented by pulses of that series of pulses, is recorded. Instead the circuits are reconditioned to respond to the next series of pulses transmitted from the subscriber's station in the manner described above.

The system is arranged for testing purposes for manual or automatic operation on a one call at a time basis. When it is desired to cause the receiving equipment to respond to one chosen subscriber's designation key 903 is moved to its operated position. Under these circumstances the system operates as described above and records the numerical values of the digits selected and causes error register 906 to operate or the O. K. register to operate. If an improper number of pulses are received as described hereinbefore, the entire system recycles as described above and responds to the succeeding group of pulses representing the subscriber's designation. Upon the operation of the various register relays, associated lamps and one of the other of the registers 905 or 906, the operation of the circuit is arrested until key 904 is momentarily operated at which time a circuit is completed for the operation of relay 818. Relay 818 causes the various relays to operate as described above and restore the circuits to their normal or their idle condition except that with key 903 operated a circuit is completed for maintaining relay 818 operated under control of relay 815. This circuit extends from battery through the winding of relay 818, lower operated contacts of key 903 to ground through the upper inner operated contacts of relay 815. Under these circumstances relay 818 is maintained operated which relay in turn maintains relays 811 and 819 operated and relay 819 maintains relay 815 operated while relay 811 maintains relays 808 and 809 operated. Under these circumstances relay 815 in remaining operated prevents the reoperation of relay 810. The circuits thus remain in the above-described condition until either key 902 is released or key 903 released at which time relay 818 releases and releases the above-described relays which are maintained operated thereby and restores the circuit to its idle or normal condition. Thereafter the circuit may be operated either on a manual or automatic basis as described hereinbefore.

In order to aid in operating the system small two-element gas discharge lamps frequently called "neon lamps" are connected in the double stability circuits so that the condition of these circuits may be readily observed. Thus lamp 350 is lighted when the right-hand section of tube 321 is conducting. Lamp 351 is lighted when the right-hand section of tube 323 is conducting. Likewise, lamps 450, 1050, 1051, and 1052 indicate the conducting conditions of the respective tubes 422, 1110, 1112, and 1114.

What is claimed is:

1. A pulse receiving system for determining the identity of a digit represented by one of a plurality of different time intervals occurring between two pulses, comprising apparatus responsive to a first pulse, apparatus for transmitting said first pulse through a plurality of delay paths having different delay intervals related to the different intervals between the pulses representing different digits, comprising apparatus for comparing the output of each delay path with a second pulse, and selecting means for selecting one of said paths in which the output of said comparing apparatus is below a predetermined reference value.

2. A pulse receiving system for determining the identity of a symbol represented by one of a plurality of different time intervals occurring between two pulses which comprises apparatus responsive to a start or reference pulse, apparatus for transmitting said start or reference pulse over a plurality of delay paths having delay intervals which are substantially equal to the respective intervals occurring between different sets of said pulses, apparatus for matching the output of each delay path with an undelayed symbol pulse, means for substantially cancelling the symbol pulse and the undelayed pulse in one channel wherein the symbol pulse and the delayed pulse occur substantially simultaneously.

3. In a pulse signaling system, pulse receiving equipment responsive to a start or reference pulse and one or more significant pulses and apparatus to determine the presence or absence of said significant pulse, comprising means for delaying said start pulse and other apparatus for combining the delayed start pulse with said significant pulse in phase opposition.

4. In a pulse signaling system, pulse receiving equipment responsive to a start or reference pulse and to one or more significant pulses, and apparatus to determine the presence or absence of said significant pulse, comprising means for delaying said start pulse and other apparatus for combining the delayed start pulse with said significant pulse in phase opposition, integrating apparatus for integrating the absolute value of said combined pulses for a substantial portion of one of said pulses.

5. In a pulse signaling system, pulse receiving equipment responsive to a start or reference pulse and one or more significant pulses, apparatus to determine the presence or absence of said significant pulse, comprising means for delaying said start pulse and other apparatus for combining the delayed start pulse with said significant pulse in phase opposition, and means for indicating the coincidence of said delayed and said undelayed pulses.

6. A pulse receiver comprising apparatus responsive to a reference pulse, a plurality of delay devices having different delay intervals, means for transmitting said reference pulse to said delay devices and apparatus responsive to another pulse, means for combining said other pulse with the output of each of said delay devices, apparatus for summing the difference between said other pulse and the output of said delay devices for the duration of said other pulse.

7. A pulse receiver comprising apparatus responsive to a reference pulse, a plurality of delay devices having different delay intervals, means for transmitting said reference pulse to said delay devices and apparatus responsive to a second pulse, means for combining said second pulse with the output of each of said delay devices, apparatus for summing the difference between said second pulse and the output of said delay devices for the duration of said second pulse, and apparatus responsive to a coincidence of said second pulse and the output of one of said delay devices for registering the coincidence of said delayed reference pulse and said second pulse.

8. A signal receiver for receiving a pair of signals representing a symbol comprising in combination a magnetic recording apparatus, a continuously moving magnetic recording medium, means for recording one signal of said pair of signals in said recording medium, apparatus for recording the other signal of said pair of signals in a different position in said recording medium, and means responsive to the relationship between said positions to determine the identity of the symbol represented by said pair of signals.

9. A signal receiver for receiving a pair of sequential signals representing a symbol comprising in combination a continuously ferromagnetic medium, apparatus for recording the first of said signals in said continuously moving ferromagnetic medium, apparatus for recording the other of said pair of signals at a different place in said ferromagnetic medium, and apparatus controlled by the distance between said signals in said medium to determine the identity of the symbol represented by said pair of signals.

10. A signal receiver for receiving a pair of sequential signals representing a symbol comprising in combination a magnetic record medium, recording apparatus for recording signals in said medium, a plurality of pick-up devices for recovering said stored signals, means for continuously changing the relative positions of said recording medium and said recording apparatus and pick-up devices, and means responsive to the relative distance between said signals in said medium for determining the identity of the symbol represented by said pair of signals.

11. In combination in a pulse receiving system, apparatus for receiving a pair of sequential pulses separated by one of a plurality of different time intervals, a plurality of delay devices having different delay intervals related to the different time intervals between transmitted pulses, means for transmitting the first pulse of said pair of pulses to said delay device to secure therefrom a plurality of pulses each delayed by a different one of said delay intervals, comparing means for comparing the other of said pulses with the output of each of said delay devices, integrating apparatus for integrating the absolute value of the difference between said delayed pulses and said other pulse for a substantial portion of one of said pulses and means responsive to said integration for registering the time interval between said pulses.

12. In a pulse signaling system, pulse receiving apparatus responsive to a reference pulse, a plurality of different delay channels having different intervals of delay, means for transferring said reference pulse to said delay channels, apparatus responsive to another pulse for taking the difference between said other pulse and the output of each of said delay channels, apparatus for integrating the absolute value of the difference between said other pulse and the output of each of said channels and apparatus responsive to one of said integrations which does not exceed a predetermined reference value.

13. In a pulse receiver, apparatus for comparing two sequentially received pulses comprising means for deriving an electrical condition under control of the difference in amplitude of said two pulses, full wave rectifier connected to said means, a storage capacitor for integrating the absolute value of the said electrical condition and switching means for operatively interconnecting said condenser with said rectifier for the duration of one of said pulses.

14. In a signaling receiver in combination, apparatus for receiving a reference pulse followed by second pulse at any one of a plurality of predetermined intervals of time following said reference pulse, apparatus for similarly storing both of said pulses, whereby the effect of said storing apparatus is substantially the same upon both of said pulses, delay apparatus for delaying one of said pulses different intervals of time related to the said different intervals of time at which said second pulse may be transmitted after said first pulse, comparing means for comparing said second stored pulse with each of said delayed pulses for deriving electrical quantities which are functions of the difference between said second pulse and said delayed pulses, a high impedance full wave rectifier connected to said comparing means, a storage condenser for integrating the absolute value of said electrical quantity, switching apparatus for operatively interconnecting said condenser and said rectifier for a predetermined time interval, and apparatus responsive to one of said integrations which does not exceed a predetermined reference level for registering the time interval between said pulses.

15. A pulse receiver comprising means for storing received pulses, comparing apparatus for comparing two stored pulses, means responsive to a received pulse when said pulse exceeds a predetermined amplitude for initiating the operation of said comparing apparatus, and means for delaying the application of said pulses to said comparing apparatus for a time interval to permit said comparing apparatus to compare the stored pulses for their entire duration.

16. A pulse receiver comprising in combination apparatus responsive to a reference pulse followed by significant pulses any one of a plurality of different time intervals thereafter, a plurality of delay devices having different delay intervals which delay intervals are substantially equal to the different time intervals which said significant pulse may occupy following said reference pulse, means for transmitting said reference pulse through said delay devices, means for comparing said significant pulse with the output of said delay devices to obtain a difference between the outputs of said delay devices and said significant pulse, a plurality of condensers, apparatus for holding the voltage of one of the terminals of said condensers at a reference value, means for charging said condensers under control of the differences between said outputs and said significant pulse, apparatus for thereafter changing the reference voltage of said one terminal to another value to record the time interval between said pulses.

17. In combination, a signal receiver responsive to pairs of sequential pulses separated by one of a plurality of different predetermined time intervals, said receiver comprising apparatus to determine the spacing between the pairs of pulses, said apparatus comprising means for delaying the first pulse of each of said pairs of pulses, comparing means for comparing said delayed first pulses with the other pulse of the respective pairs of pulses and means connected to said comparing means responsive to the differences between said delayed pulses and said other pulses for indicating the coincidence of one of said delayed pulses and the other pulses of each of said pairs of pulses.

WILLIAM A. MALTHANER.
NEAL D. NEWBY.
HENRY E. VAUGHAN.

REFERENCES CITED

The following references are of record in the file of this patent:

UNITED STATES PATENTS

| Number | Name | Date |
|---|---|---|
| 1,952,369 | Gardner | Mar. 27, 1934 |
| 2,403,009 | McCann | July 2, 1946 |
| 2,403,561 | Smith | July 9, 1946 |
| 2,407,336 | Young | Sept. 10, 1946 |
| 2,415,359 | Loughlin | Feb. 4, 1947 |
| 2,443,198 | Sallach | June 15, 1948 |
| 2,449,819 | Purington | Sept. 21, 1948 |